(12) United States Patent
Imaoka et al.

(10) Patent No.: US 12,352,998 B2
(45) Date of Patent: Jul. 8, 2025

(54) LIGHT SOURCE DEVICE AND PROJECTOR

(71) Applicant: SEIKO EPSON CORPORATION, Tokyo (JP)

(72) Inventors: Norio Imaoka, Takamori-machi (JP); Yuichiro Iwama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/793,348

(22) Filed: Aug. 2, 2024

(65) Prior Publication Data

US 2025/0044499 A1    Feb. 6, 2025

(30) Foreign Application Priority Data

Aug. 2, 2023   (JP) .................................. 2023-126580

(51) Int. Cl.
*F21V 8/00* (2006.01)
*G03B 21/20* (2006.01)

(52) U.S. Cl.
CPC ......... *G02B 6/0083* (2013.01); *G02B 6/0068* (2013.01); *G03B 21/2013* (2013.01)

(58) Field of Classification Search
CPC . G02B 6/0083; G02B 6/0068; G03B 21/2013
See application file for complete search history.

(56) References Cited

U.S. PATENT DOCUMENTS

| | | | | |
|---|---|---|---|---|
| 11,835,747 | B2* | 12/2023 | Yu | G02B 6/0085 |
| 2005/0141244 | A1* | 6/2005 | Hamada | G02F 1/133615 |
| | | | | 362/612 |
| 2013/0027635 | A1* | 1/2013 | Urano | G02B 6/0065 |
| | | | | 362/618 |
| 2013/0286294 | A1* | 10/2013 | Hosoki | G02B 6/0091 |
| | | | | 348/739 |
| 2014/0307464 | A1* | 10/2014 | Horiuchi | G02B 6/0091 |
| | | | | 362/602 |
| 2014/0347884 | A1* | 11/2014 | Fujiuchi | G02B 6/0071 |
| | | | | 362/217.05 |
| 2018/0284340 | A1* | 10/2018 | Koizumi | G03B 21/16 |
| 2020/0026172 | A1* | 1/2020 | Sakata | G02B 27/0994 |
| 2020/0033536 | A1* | 1/2020 | Suzuki | G03B 21/208 |
| 2021/0254799 | A1* | 8/2021 | Chang | F21V 9/30 |

FOREIGN PATENT DOCUMENTS

| | | |
|---|---|---|
| JP | 2011-091256 A | 5/2011 |
| WO | WO 2020/254455 A | 12/2020 |

* cited by examiner

*Primary Examiner* — Mary Ellen Bowman
(74) *Attorney, Agent, or Firm* — Dority & Manning, P.A.

(57) ABSTRACT

A light source device of the present disclosure includes a light source unit including a first coupling part which is disposed in the gap and electrically couples the first and second light emitting element groups, and a first regulatory member which is disposed between a light guide member and a base substrate, and regulates a position of a light guide member with respect to a support member. The first light emitting element group has a configuration in which a plurality of first light emitting elements is coupled in series so that a current flows along a first direction, and the second light emitting element group has a configuration in which a plurality of second light emitting elements is coupled in series so that a current flows along a second direction opposite to the first direction. The first regulatory member is disposed to overlap the first coupling part.

14 Claims, 9 Drawing Sheets

LIGHT SOURCE DEVICE AND PROJECTOR

The present application is based on, and claims priority from JP Application Serial Number 2023-126580, filed Aug. 2, 2023, the disclosure of which is hereby incorporated by reference herein in its entirety.

BACKGROUND

1. Technical Field

The present disclosure relates to a light source device and a projector.

2. Related Art

As a light source device used in a projector, there has been proposed a light source device using fluorescence emitted from a phosphor when the phosphor is irradiated with excitation light emitted from a light emitting element. WO 2020/254455 discloses a light source device including an excitation light source in which a plurality of light emitting elements is mounted on a circuit board, a phosphor rod that converts excitation light emitted from each of the light emitting elements of the excitation light source into fluorescence, a holder that holds the phosphor rod, and a pressing member that presses the phosphor rod against the holder.

In the light source device, the plurality of light emitting elements is arranged in a line on the circuit board. JP-A-2011-091256 discloses a technique of coupling a plurality of LED elements in series on a circuit board.

WO 2020/254455 and JP-A-2011-091256 are examples of the related art.

Then, it is also conceivable to couple the plurality of light emitting elements in series on the circuit board by combining the technique disclosed in JP-A-2011-091256 with the light source device of WO 2020/254455. In the configuration in which a plurality of light emitting elements is coupled in series in such a manner, the circuit board is apt to grow in size, and there arises a necessity that the pressing member is disposed at a position where the pressing member dose not overlap the light emitting element in a plan view so that the pressing member does not block the light emitted from the light emitting element, and therefore, there is a problem that the degree of freedom of the arrangement position of the pressing member is low.

SUMMARY

In view of the problem described above, a light source device according to an aspect of the present disclosure includes a light source unit including a base substrate, a first light emitting element group and a second light emitting element group which are arranged on the base substrate with a gap between the first light emitting element group and the second light emitting element group, and a first coupling part which is disposed in the gap and electrically couples the first light emitting element group and the second light emitting element group to each other; a light guide member configured to guide light emitted from the light source unit; a support member which is configured to support the light guide member, and to which the base substrate of the light source unit is fixed; and a regulatory member which is disposed between the light guide member and the base substrate, and is configured to regulate a position of the light guide member with respect to the support member, wherein the first light emitting element group has a configuration in which a plurality of first light emitting elements is coupled in series so that a current flows along a first direction, the second light emitting element group has a configuration in which a plurality of second light emitting elements is coupled in series so that a current flows along a second direction opposite to the first direction, and the regulatory member is disposed to overlap the first coupling part in the gap in a plan view of the regulatory member and the first coupling part.

A projector according to an aspect of the present disclosure includes: the light source device according to the aspect of the present disclosure; a light modulation device configured to modulate light emitted from the light source device in accordance with image information; and a projection optical device configured to project the light modulated by the light modulation device.

DESCRIPTION OF EMBODIMENTS

An embodiment of the present disclosure will hereinafter be described.

A projector according to the present embodiment is an example of a projector using liquid crystal panels as light modulation devices.

In the following drawings, elements are drawn at different dimensional scales in some cases in order to make the elements eye-friendly.

Figure 1:
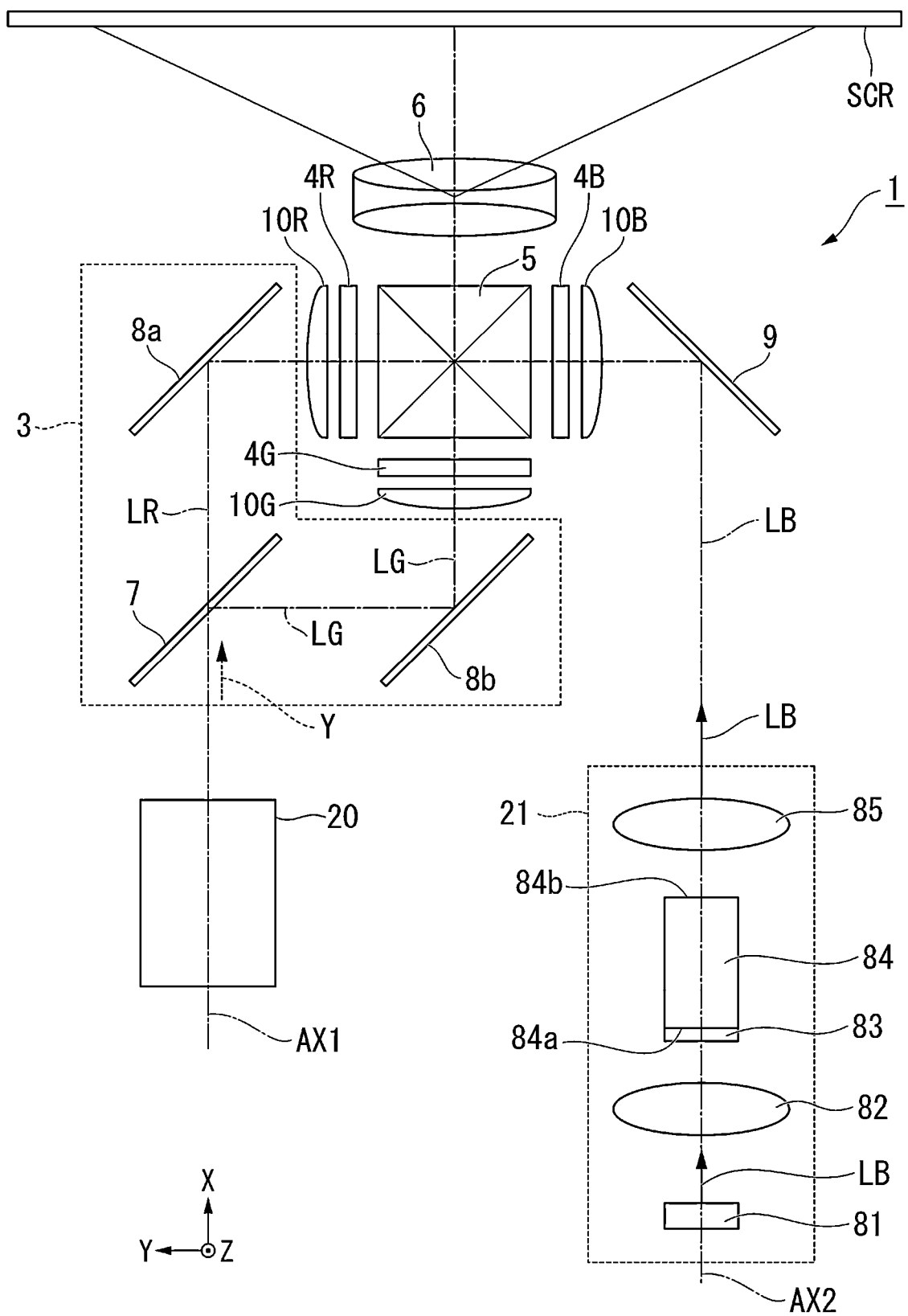
FIG. 1 is a diagram showing a schematic configuration of a projector according to a first embodiment.

FIG. 1 is a diagram showing a schematic configuration of a projector 1 according to the present embodiment.

The projector 1 according to the present embodiment is a projection-type image display apparatus that displays a color image on a screen SCR, which is a projection target surface, as shown in FIG. 1. The projector 1 includes three light modulation devices corresponding to respective colored light, namely red light LR, green light LG, and blue light LB.

The projector 1 includes a first illumination device 20, a second illumination device 21, a color separation optical system 3, a light modulation device 4R, a light modulation device 4G, a light modulation device 4B, a light combining element 5, and a projection optical device 6.

The first illumination device 20 emits yellow fluorescence Y toward the color separation optical system 3. The second illumination device 21 emits the blue light LB toward the light modulation device 4B. Detailed configurations of the first illumination device 20 and the second illumination device 21 will be described later.

The description with reference to the drawings will hereinafter be made using an X-Y-Z orthogonal coordinate system in as needed. The Z axis is an axis extending along a vertical direction of the projector 1. The X axis is an axis parallel to an optical axis AX1 of the first illumination device 20 and an optical axis AX2 of the second illumination device 21. The Y axis is an axis perpendicular to the X axis and the Z axis. The optical axis AX1 of the first illumination device 20 is a central axis of the fluorescence Y emitted from the first illumination device 20. The optical axis AX2 of the second illumination device 21 is a central axis of the blue light LB emitted from the second illumination device 21. One direction along the X axis is referred to a +X direction, the opposite direction thereof is referred to as a −X direction, one direction along the Y axis is referred to as a +Y direction, the opposite direction thereof is referred to as a −Y direction, one direction along the Z axis is referred to as a +Z direction, and the opposite direction thereof is referred to as a −Z direction. Further, the two directions along the X axis are collectively referred to as an X-axis direction without being distinguished from each other, the two directions along the Y axis are collectively referred to as a Y-axis direction without being distinguished from each other, and the two directions along the Z axis are collectively referred to as a Z-axis direction without being distinguished from each other.

In the present embodiment, the "+X direction" corresponds to a "first direction" in the appended claims, and the "−X direction" corresponds to a "second direction" of the appended claims. The +Z direction or the −Z direction corresponds to a "direction crossing the first direction" in the appended claims.

The color separation optical system 3 separates the yellow fluorescence Y emitted from the first illumination device 20 into the red light LR and the green light LG. The color separation optical system 3 includes a dichroic mirror 7, a first reflecting mirror 8a, and a second reflecting mirror 8b.

The dichroic mirror 7 separates the fluorescence Y into the red light LR and the green light LG. The dichroic mirror 7 transmits the red light LR and reflects the green light LG. The second reflecting mirror 8b is disposed in a light path of the green light LG. The second reflecting mirror 8b reflects the green light LG, which has been reflected by the dichroic mirror 7, toward the light modulation device 4G. The first reflecting mirror 8a is disposed in the light path of the red light LR. The first reflecting mirror 8a reflects the red light LR, which has been transmitted through the dichroic mirror 7, toward the light modulation device 4R.

Meanwhile, the blue light LB emitted from the second illumination device 21 is reflected by a reflecting mirror 9 toward the light modulation device 4B.

The second illumination device 21 includes a second light source 81, a condenser lens 82, a diffuser plate 83, a rod lens 84, and a relay lens 85. The second light source 81 is formed of at least one semiconductor laser. The second light source 81 emits the blue light LB formed of a laser beam. The second light source 81 is not necessarily formed of a semiconductor laser and may be formed of an LED that emits blue light.

The condenser lens 82 is formed of a convex lens. The condenser lens 82 causes the blue light LB emitted from the second light source 81 to enter the diffuser plate 83 in a state of being substantially converged thereon. The diffuser plate 83 diffuses the blue light LB emitted from the condenser lens 82 at a predetermined degree of diffusion to generate the blue light LB having a substantially uniform light distribution similar to that of the fluorescence Y emitted from the first illumination device 20. As the diffuser plate 83, there is used, for example, a ground glass plate made of optical glass.

The blue light LB diffused by the diffuser plate 83 enters the rod lens 84. The rod lens 84 has a prismatic shape extending along the direction of the optical axis AX2 of the second illumination device 21. The rod lens 84 has a light incident end surface 84a disposed at one end and a light exit end surface 84b disposed at the other end. The diffuser plate 83 is fixed to the light incident end surface 84a of the rod lens 84 via an optical adhesive (not shown). It is desirable that the refractive index of the diffuser plate 83 matches as much as possible with the refractive index of the rod lens 84.

The blue light LB propagates through the interior of the rod lens 84 while being totally reflected therein to thereby be emitted from the light exit end surface 84b in a state in which uniformity of the illuminance distribution is enhanced. The blue light LB emitted from the rod lens 84 enters the relay lens 85. The relay lens 85 causes the blue light LB, the illuminance distribution of which is enhanced in uniformity by the rod lens 84, to enter the reflecting mirror 9.

The light exit end surface 84b of the rod lens 84 has a rectangular shape substantially similar to the shape of an image formation region of the light modulation device 4B. The blue light LB emitted from the rod lens 84 is thus efficiently incident on the image formation region of the light modulation device 4B.

The light modulation device 4R modulates the red light LR in accordance with image information to form image light corresponding to the red light LR. The light modulation device 4G modulates the green light LG in accordance with image information to form image light corresponding to the green light LG. The light modulation device 4B modulates the blue light LB in accordance with image information to form image light corresponding to the blue light LB.

As each of the light modulation devices 4R, 4G, and 4B, there is used, for example, a transmissive liquid crystal panel. Further, polarization plates (not shown) are respectively disposed at an incident side and an exit side of the liquid crystal panel. The polarization plate only transmits linearly polarized light polarized in a specific direction.

A field lens 10R is disposed at the incident side of the light modulation device 4R. A field lens 10G is disposed at the incident side of the light modulation device 4G. A field lens 10B is disposed at the incident side of the light modulation device 4B. The field lens 10R collimates the chief ray of the red light LR to be incident on the light modulation device 4R. The field lens 10G collimates the chief ray of the green light LG to be incident on the light modulation device 4G. The field lens 10B collimates the chief ray of the blue light LB to be incident on the light modulation device 4B.

In response to the image light emitted from the light modulation device 4R, the image light emitted from the light modulation device 4G, and the image light emitted from the light modulation device 4B entering the light combining element 5, the light combining element 5 combines the image light corresponding to the red light LR, the image light corresponding to the green light LG, and the image light corresponding to the blue light LB with one another to emit the image light thus combined toward the projection optical device 6. As the light combining element 5, there is used, for example, a cross dichroic prism.

The projection optical device 6 is formed of a plurality of projection lenses. The projection optical device 6 projects the image light combined by the light combining element 5 toward the screen SCR in an enlarged manner. Thus, a color image is displayed on the screen SCR.

A configuration of the first illumination device 20 will subsequently be described.

Figure 2:
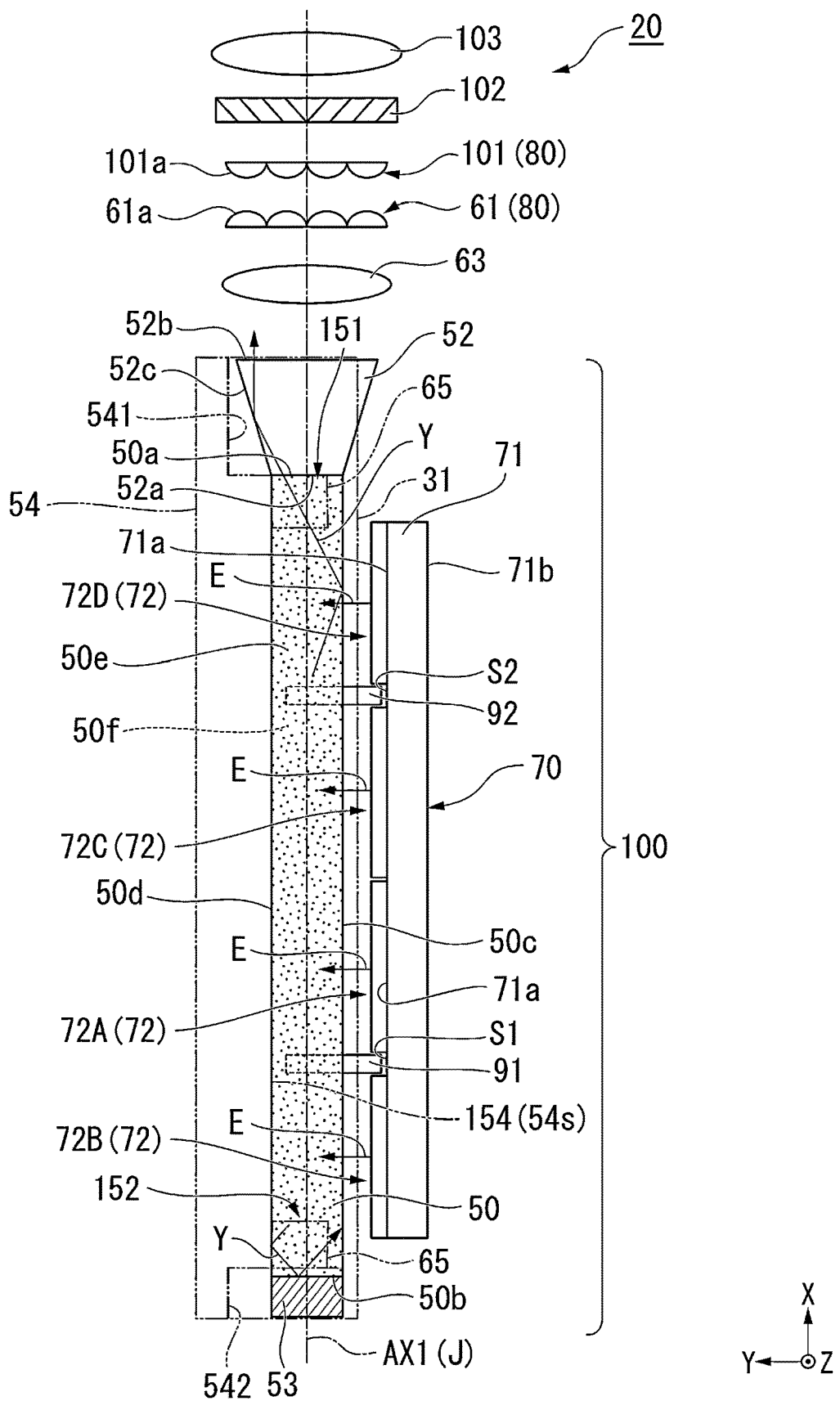
FIG. 2 is a schematic configuration diagram of a first illumination device.

FIG. 2 is a schematic configuration diagram of the first illumination device 20.

The first illumination device 20 includes a light source device 100, a collimating optical system 63, an integrator optical system 80, a polarization conversion element 102, and a superimposing optical system 103, as shown in FIG. 2.

The light source device 100 includes a wavelength conversion member 50, a light source unit 70, an angle conversion member 52, a mirror 53, a support member 54, a holding member 65, and a pair of pressing members 91, 92. The wavelength conversion member 50 in the present embodiment corresponds to a "light guide member" in the appended claims.

The wavelength conversion member 50 has a quadrangular columnar shape extending along the X axis and has six surfaces. In the wavelength conversion member 50, the sides extending along the X axis are longer than the sides extending along the Y axis and the sides extending along the Z axis. Therefore, the X axis corresponds to a longitudinal direction of the wavelength conversion member 50. The length of the sides extending along the Y axis is equal to the length of the sides extending along the Z axis. That is, the cross-sectional shape of the wavelength conversion member 50 cut by a plane along the Y-Z plane perpendicular to the X axis is a square. The cross-sectional shape of the wavelength conversion member 50 cut by the plane along the Y-Z plane may be a rectangular shape.

The wavelength conversion member 50 has a first surface 50*a* and a second surface 50*b*, a third surface 50*c* and a fourth surface 50*d*, and a fifth surface 50*e* and a sixth surface 50*f*. The first surface 50*a* and the second surface 50*b* cross the X axis extending along the longitudinal direction of the wavelength conversion member 50 and are located at respective sides opposite to each other in the X axis. In the present embodiment, the first surface 50*a* is located at the +X side which is one of the X-axis directions along the X axis, and the second surface 50*b* is located at the −X side which is the opposite direction of the X-axis directions.

The third surface 50*c* and the fourth surface 50*d* cross the first surface 50*a* and the second surface 50*b*, and are located at respective sides opposite to each other in the Y axis which crosses, is perpendicular to in the case of the present embodiment, the X axis along the longitudinal direction of the wavelength conversion member 50. In the present embodiment, the third surface 50*c* is located at the −Y side which is one of the Y-axis directions along the Y axis, and the fourth surface 50*d* is located at the +Y side which is the other of the Y-axis directions.

The fifth surface 50*e* and the sixth surface 50*f* cross the third surface 50*c* and the fourth surface 50*d*, and are located at respective sides opposite to each other in the Z axis which crosses, is perpendicular to in the present embodiment, the X axis and the Y axis. In the present embodiment, the fifth surface 50*e* is located at the +Z direction side which is a side in one of the Z-axis directions, and the sixth surface 50*f* is located at the −Z direction side which is a side in the other of the Z-axis directions.

In the following description, the third surface 50*c*, the fourth surface 50*d*, the fifth surface 50*e*, and the sixth surface 50*f* may be simply referred to as side surfaces 50*c*, 50*d*, 50*e*, and 50*f* in some cases when they are not distinguished from each other.

The wavelength conversion member 50 at least includes a phosphor, and converts excitation light E which is emitted from the light source unit 70 and has a first wavelength band into the fluorescence Y which has a second wavelength band different from the first wavelength band. The excitation light E enters the wavelength conversion member 50 via the third surface 50*c*. The fluorescence Y is guided through the interior of the wavelength conversion member 50 and is then emitted from the first surface 50*a*. The excitation light E in the present embodiment corresponds to "first light" in the appended claims. The fluorescence Y in the present embodiment corresponds to "second light" in the appended claims.

The wavelength conversion member 50 contains a ceramic phosphor formed of a polycrystalline phosphor that performs the wavelength conversion on the excitation light E into the fluorescence Y. The second wavelength band that the fluorescence Y has is a yellow wavelength band in a range of, for example, 490 through 750 nm. That is, the fluorescence Y is yellow fluorescence containing a red light component and a green light component.

The wavelength conversion member 50 may include a single crystal phosphor instead of a polycrystalline phosphor. Alternatively, the wavelength conversion member 50 may be made of fluorescent glass. Alternatively, the wavelength conversion member 50 may be formed of a material obtained by dispersing a large number of phosphor particles in a binder made of glass or resin. The wavelength conversion member 50 made of such a material converts the excitation light E into the fluorescence Y.

Specifically, the material of the wavelength conversion member 50 includes, for example, an yttrium-aluminum-garnet-based (YAG-based) phosphor. Citing YAG:Ce including cerium (Ce) as an activator as an example, as the material of the wavelength conversion member 50, there is used a material obtained by mixing raw powder materials including elements such as $Y_2O_3$, $Al_2O_3$, or $CeO_3$ to cause a solid-phase reaction, Y—Al—O amorphous particles obtained by a wet method such as a coprecipitation method or a sol-gel method, YAG particles obtained by a gas-phase method such as a spray-drying method, a flame-based thermal decomposition method, or a thermal plasma method, or the like.

The light source unit 70 includes a base substrate 71 and a plurality of light emitting element groups 72. The base substrate 71 includes a first surface 71*a* and a second surface 71*b* at an opposite side to the first surface 71*a*. The base substrate 71 has a structure in which a plurality of layers is stacked as described later.

The plurality of light emitting element groups 72 are disposed on the first surface 71*a* of the base substrate 71. The light source unit 70 in the present embodiment includes the plurality of light emitting element groups 72, but the number of the light emitting element groups 72 is not particularly limited.

In the present embodiment, the plurality of light emitting element groups 72 includes a first light emitting element group 72A, a second light emitting element group 72B, a third light emitting element group 72C, and a fourth light emitting element group 72D. Detailed configurations of the light emitting element groups 72A, 72B, 72C, and 72D will be described later.

The light emitting element groups 72A, 72B, 72C, and 72D are opposed to the third surface 50c of the wavelength conversion member 50, and emit the excitation light E in the first wavelength band toward the third surface 50c. The first wavelength band is, for example, a blue-violet wavelength band in a range of 400 nm through 480 nm, and a peak wavelength is, for example, 445 nm.

As described above, the light source unit 70 is disposed to be opposed to the third surface 50c, which is one of the four side surfaces 50c, 50d, 50e, and 50f extending along the longitudinal direction of the wavelength conversion member 50.

Figure 3:
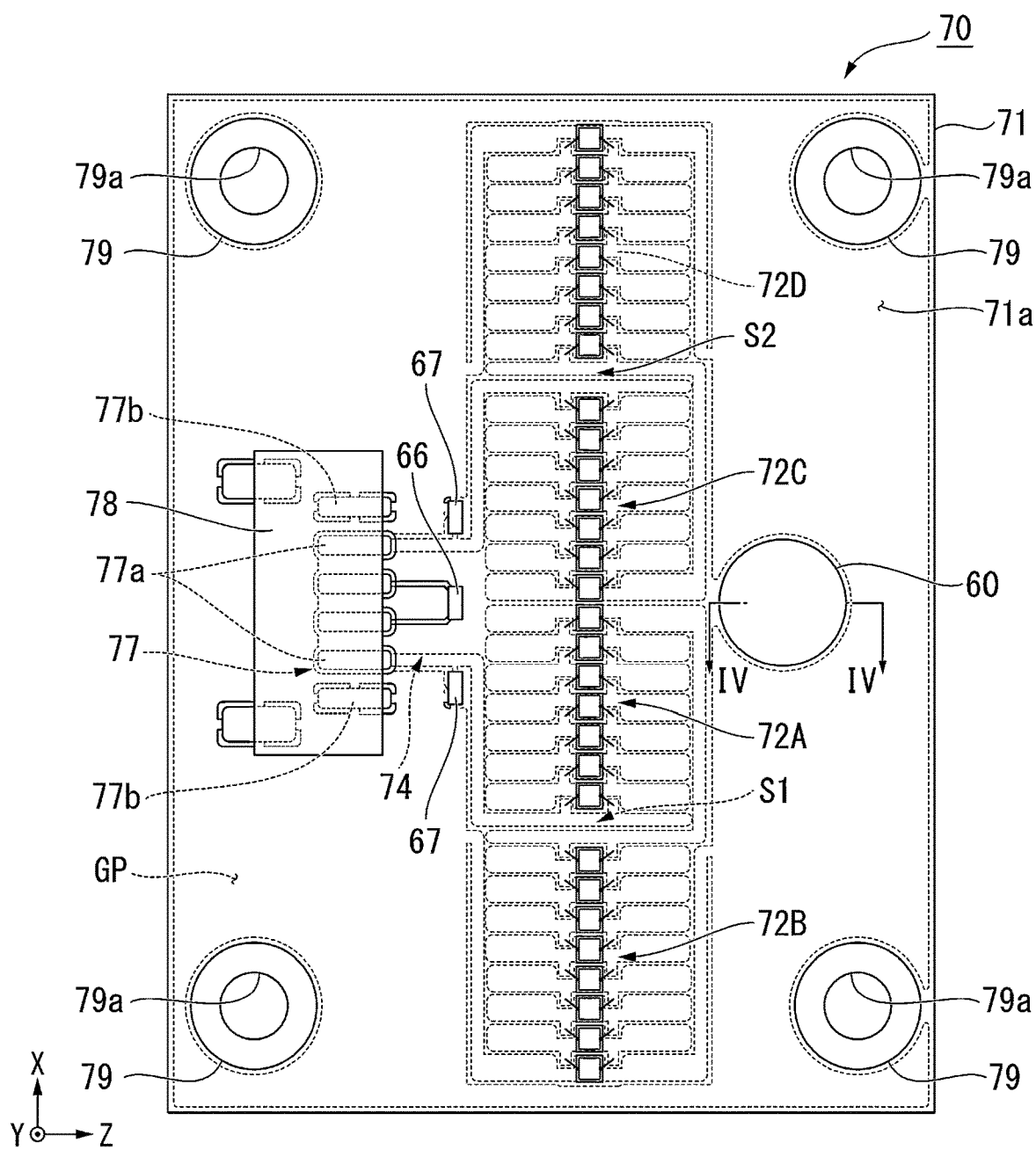
FIG. 3 is a plan view showing a schematic configuration of a light source unit.

FIG. 3 is a plan view showing a schematic configuration of the light source unit 70. FIG. 3 is a plan view of the first surface 71a of the base substrate 71 of the light source unit 70.

As shown in FIG. 3, the base substrate 71 has a substantially rectangular shape. The light emitting element groups 72A, 72B, 72C, and 72D are arranged on the first surface 71a of the base substrate 71. The base substrate 71 further includes an interconnection group 74, a terminal part 77 electrically coupled to the light emitting element groups 72A, 72B, 72C, and 72D via the interconnection group 74, a connector unit 78 electrically coupled to the terminal part 77, a fixation part 79, a concave portion 60, a first electronic component 66, and second electronic components 67.

The first light emitting element group 72A and the second light emitting element group 72B are disposed on the base substrate 71 with a gap S1 therebetween. The third light emitting element group 72C and the fourth light emitting element group 72D are disposed on the base substrate 71 with a gap S2 therebetween.

Therefore, since none of the light emitting elements of any of the light emitting element groups is disposed in the gap S1 and the gap S2, there is no chance for the excitation light to be emitted from the gap S1 or the gap S2.

The terminal part 77 includes a plurality of first terminals 77a and a plurality of second terminals 77b. The first terminals 77a are terminals into which a current flows from an external device. The second terminals 77b are terminals coupled to a ground pattern GP of the base substrate 71 and are coupled to the ground potential of the external device. The terminal part 77 is disposed on the base substrate 71 at the −Z direction side which is one side in the Z-axis direction crossing the X-axis direction in which the light emitting element groups 72A, 72B, 72C, and 72D are arranged.

The connector unit 78 electrically couples the external device and the light source unit 70 to each other. The connector unit 78 includes terminals that couple the terminal part 77 and the external device to each other. The connector unit 78 supplies the currents supplied from the external device to the light emitting element groups 72A, 72B, 72C, and 72D via the terminal part 77 and the interconnection group 74. The fixation part 79 is a region for fixing the base substrate 71 of the light source unit 70 to the support member 54 described later. The fixation part 79 fixes the base substrate 71 to the support member 54 via screw members. The fixation part 79 is formed of a plurality of through holes, four through holes 79a in the present embodiment, for inserting the screw members.

When the base substrate 71 is fixed to the support member 54, a convex portion provided to the support member 54 is inserted into the concave portion 60. As the first electronic component 66, there is used, for example, a thermistor. As the second electronic component 67, there is used, for example, a varistor.

The fixation part 79 is disposed in an outer circumferential edge portion of the base substrate 71. Specifically, the four through holes 79a are respectively arranged at corner portions of the base substrate 71 having a rectangular shape. The fixation part 79 fixes the light source unit 70 and the support member 54 to each other so that the light emitting element groups 72A, 72B, 72C, and 72D disposed on the first surface 71a of the base substrate 71 are opposed to the wavelength conversion member 50.

Figure 4:
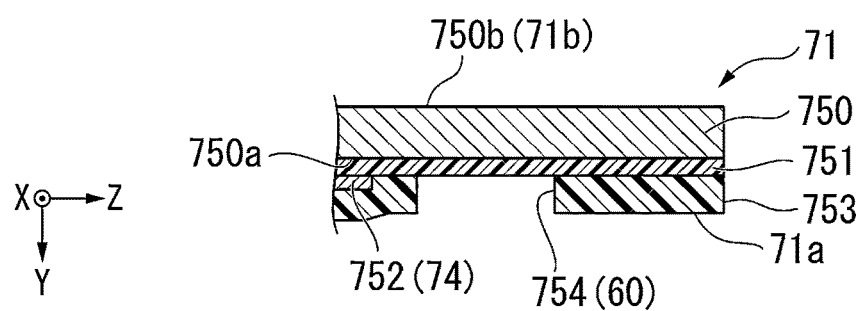
FIG. 4 is a cross-sectional view taken along the arrow line IV-IV in FIG. 3.

FIG. 4 is a cross-sectional view taken along the arrow line IV-IV in FIG. 3.

As shown in FIG. 4, the base substrate 71 of the light source unit 70 includes a base 750 having an obverse surface 750a and a reverse surface 750b, a first insulating layer 751 disposed on the obverse surface 750a as one surface of the base 750, a conductive layer 752 that is stacked at an opposite side of the first insulating layer 751 to the base 750, and forming a part of the interconnection group 74 described above, a second insulating layer 753 that is stacked at an opposite side of the first insulating layer 751 to the base 750 so as to cover the conductive layer 752, and a concave portion 754 provided to the second insulating layer 753.

As the material of the base 750, there is used, for example, aluminum excellent in heat dissipation. The first insulating layer 751 and the second insulating layer 753 are formed of a resist film. The conductive layer 752 is formed of a pattern made of gold, copper, aluminum, or the like. The concave portion 754 is an opening that exposes a part of the first insulating layer 751 and forms the concave portion 60.

In the present embodiment, the second surface 71b of the base substrate 71 means the reverse surface 750b of the base 750, and the first surface 71a of the base substrate 71 means a surface of a layer located at an outermost position out of the insulating layers and the interconnection layers stacked at the obverse surface 750a side of the base 750. Therefore, the first surface 71a of the base substrate 71 does not mean a flat surface but means a surface including unevenness corresponding to the stacked structure of the insulating layers and the interconnection layers. Each of the light emitting element groups 72A, 72B, 72C, and 72D is electrically coupled to the conductive layer 752 as described later.

Figure 5:
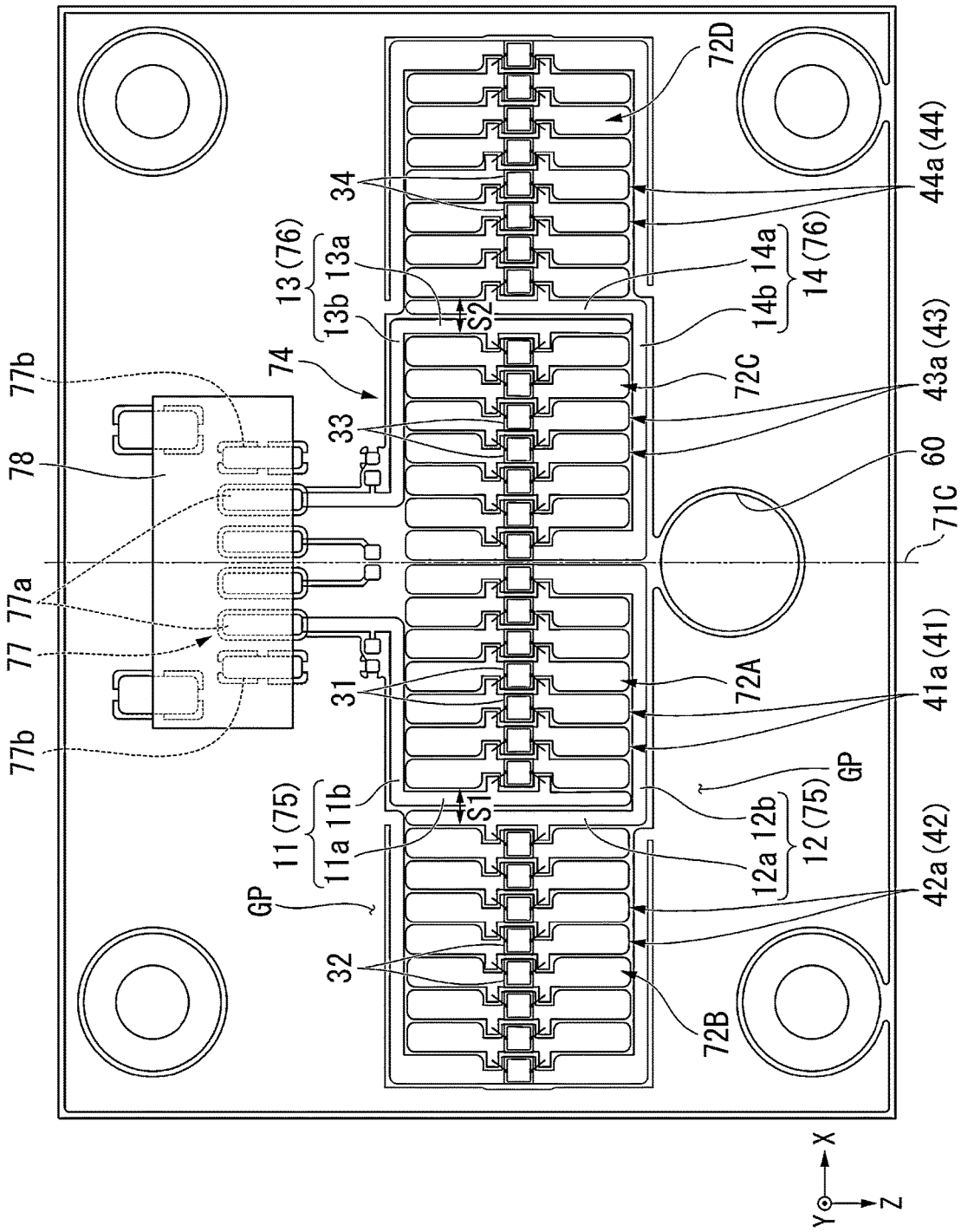
FIG. 5 is a plan view showing a circuit configuration of the light source unit.

FIG. 5 is a plan view showing a circuit configuration of the light source unit 70. In order to make the description easy to understand, FIG. 5 illustrates a state in which the second insulating layer 753 forming the first surface 71a of the base substrate 71 is removed from the light source unit 70 shown in FIG. 3.

As illustrated in FIG. 5, the first light emitting element group 72A includes a plurality of first light emitting elements 31 and a first element conducting part 41 that electrically couples the first light emitting elements 31 to each other. In the first light emitting element group 72A, the plurality of first light emitting elements 31 has a structure in which the plurality of first light emitting elements 31 is coupled in series so that a current flows along the +X direction via the first element conducting part 41.

The second light emitting element group 72B includes a plurality of second light emitting elements 32 and a second element conducting part 42 that electrically couples the second light emitting elements 32 to each other. The plurality of second light emitting elements 32 has a structure in which the plurality of second light emitting elements 32 is coupled in series so that a current flows along the −X direction via the second element conducting part 42.

That is, the direction in which the current flows in the first light emitting element group 72A is opposite to the direction in which the current flows in the second light emitting element group 72B.

The third light emitting element group 72C has a line-symmetric structure with respect to the first light emitting element group 72A when a central axis 71C that is an axis parallel to the Z axis, and passes through the center of the base substrate 71 is used as a reference. Specifically, the third light emitting element group 72C includes a plurality of third light emitting elements 33 and a third element conducting part 43, and couples the plurality of third light emitting elements 33 in series so that a current flows along the −X direction via the third element conducting part 43.

The fourth light emitting element group 72D has a line-symmetric structure with respect to the second light emitting element group 72B when the central axis 71C of the base substrate 71 is used as a reference. Specifically, the fourth light emitting element group 72D includes a plurality of fourth light emitting elements 34 and a fourth element conducting part 44, and couples the plurality of fourth light emitting elements 34 in series so that current flows along the +X direction via the fourth element conducting part 44. That is, the direction in which the current flows in the third light emitting element group 72C is opposite to the direction in which the current flows in the fourth light emitting element group 72D.

As described above, in the light source unit 70 of the present embodiment, there is provided the structure in which the first light emitting element group 72A, the second light emitting element group 72B, and the gap S1 are arranged line-symmetrically with the third light emitting element group 72C, the fourth light emitting element group 72D, and the gap S2 with reference to the central axis 71C of the base substrate 71.

The interconnection group 74 of the light source unit 70 includes a first coupling part 75, a second coupling part 76, and a ground pattern GP.

The first coupling part 75 electrically couples the first light emitting element group 72A and the second light emitting element group 72B to each other. The second coupling part 76 electrically couples the third light emitting element group 72C and the fourth light emitting element group 72D to each other.

The third light emitting element group 72C and the fourth light emitting element group 72D are not electrically coupled to the first light emitting element group 72A and the second light emitting element group 72B. That is, the first coupling part 75 and the second coupling part 76 are not electrically coupled to each other.

The first coupling part 75 is disposed in the gap S1 described above of the base substrate 71 and the second coupling part 76 is disposed in the gap S2 of the base substrate 71.

The first coupling part 75 and the second coupling part 76 have substantially the same configuration. Therefore, the description will hereinafter be presented citing the configuration of the first coupling part 75 as an example.

The first coupling part 75 includes a first interconnection 11 and a second interconnection 12. The first interconnection 11 includes a coupling region 11a and a routing region 11b. The second interconnection 12 includes a coupling region 12a and a routing region 12b.

In the present embodiment, the coupling region 11a corresponds to a "first region" in the appended claims, and the coupling region 12a corresponds to a "second region" in the appended claims.

The coupling region 11a extends along the Z direction crossing the +X direction and is coupled to the −X side of the first light emitting element group 72A. Specifically, the coupling region 11a is coupled to the first element conducting part 41 of the first light emitting element group 72A. The routing region 11b of the first interconnection 11 is routed in the X-axis direction along the first light emitting element group 72A from the −Z direction side of the coupling region 11a and is coupled to the first terminal 77a of the terminal part 77.

The coupling region 12a of the second interconnection 12 extends along the coupling region 11a of the first interconnection 11 and is coupled to the +X side of the second light emitting element group 72B. Specifically, the coupling region 12a is coupled to the second element conducting part 42 of the second light emitting element group 72B. The routing region 12b of the second interconnection 12 is routed in the +X direction from the coupling region 12a along the first light emitting element group 72A, and is coupled to the +X side of the first light emitting element group 72A. Specifically, the routing region 12b is coupled to the first element conducting part 41 of the first light emitting element group 72A.

Figure 6:
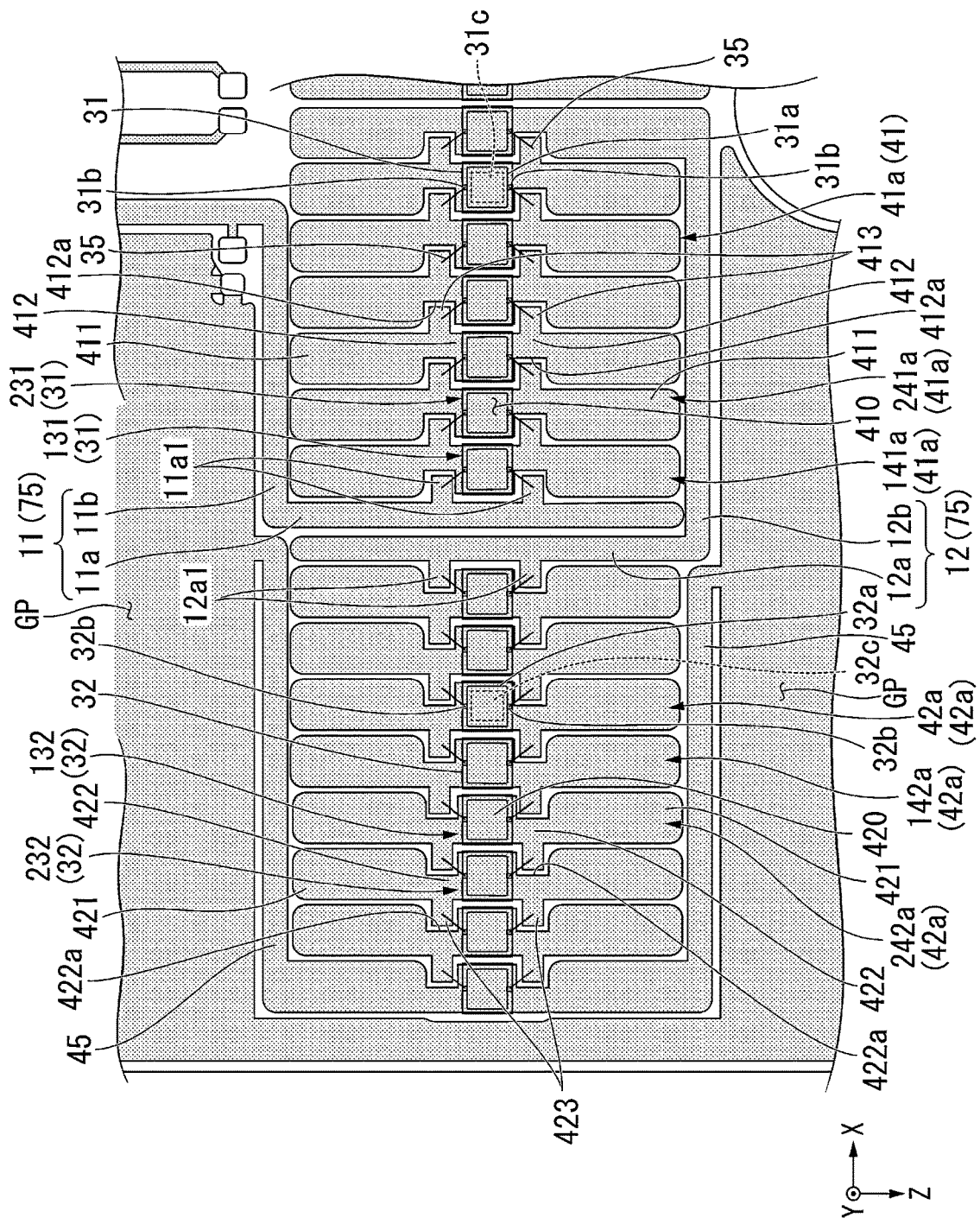
FIG. 6 is an enlarged view showing configurations of main parts of a first light emitting element group and a second light emitting element group.

FIG. 6 is an enlarged view showing configurations of main parts of the first light emitting element group 72A and the second light emitting element group 72B. As shown in FIG. 6, in the first light emitting element group 72A, the first element conducting part 41 has a plurality of first conductive patterns 41a.

Each of the first conductive patterns 41a extends in the Z-axis direction crossing the +X direction. The plurality of first conductive patterns 41a is provided so as to correspond respectively to the plurality of first light emitting elements 31. That is, the number of the first conductive patterns 41a is the same as the number of the first light emitting elements 31. Each of the conductive patterns 41a is made of gold, copper, aluminum, or the like, and corresponds to a part of the conductive layer 752 that is shown in FIG. 4, and forms a part of the interconnection group 74.

The first conductive patterns 41a are patterns separated from each other, and have the same shape. The first conductive patterns 41a adjacent to each other in the X-axis direction are not in contact with each other.

The first conductive pattern 41a includes a mounting portion 410 on which the first light emitting element 31 is mounted, a pair of projecting portions 411 projecting on both sides of the mounting portion 410, a pair of coupling portions 412 that couple the pair of projecting portions 411 and the mounting portion 410, and a pair of conducting portions 413 that are disposed at the +X side of the pair of coupling portions 412 and are electrically coupled to the first light emitting element 31 mounted on the adjacent first conductive pattern 41a. Therefore, each of the first conductive patterns 41a has a shape extending at both sides in the Z-axis direction with respect to corresponding one of the first light emitting elements 31.

Between the first conductive patterns 41a adjacent to each other in the X-axis direction, the conducting portions 413 protruding from the first conductive pattern 41a at one side (−X side) are arranged so as to enter recesses 412a of the coupling portions 412 of the first conductive pattern 41a at the other side (+X side). As a result, between the first conductive patterns 41a adjacent to each other, the conducting portions 413 of the first conductive pattern 41a at the one side (−X side) are disposed near the mounting portion 410 of the first conductive pattern 41a at the other side (+X side).

The first light emitting elements 31 are each formed of, for example, a light emitting diode (LED).

The first light emitting element 31 includes a light emitting surface 31a, two anode electrodes 31b, and a single cathode electrode 31c. In the first light emitting element 31, the light emitting surface 31a and the two anode electrodes 31b are disposed on an obverse surface facing to an opposite side to the base substrate 71 and the cathode electrode 31c is disposed on a reverse surface facing to the base substrate 71 side opposite to the obverse surface. Since the first light emitting element 31 of the present embodiment includes the two anode electrodes 31b disposed to sandwich the light emitting surface 31a, the density of a current supplied to the light emitting surface 31a is stabilized, and thus it is possible to make the light emitting surface 31a uniformly emit light. Accordingly, each of the first light emitting elements 31 can emit uniform and bright light from the light emitting surface 31a.

The light emitting surface 31a of the first light emitting element 31 is a surface that emits the excitation light E. Here, out of the two first conductive patterns 41a adjacent to each other in the X-axis direction, one on the left hand (−X side) is referred to as a first conductive pattern 141a, and one on the right hand (+X side) is referred to as a first conductive pattern 241a. Further, the first light emitting element 31 mounted on the first conductive pattern 141a is referred to as a first light emitting element 131, and the first light emitting element 31 mounted on the first conductive pattern 241a is referred to as a first light emitting element 231.

The first light emitting element 231 is mounted in a posture in which the cathode electrode 31c is placed on the mounting portion 410 of the first conductive pattern 241a. It should be noted that a solder layer, for example, is disposed between the cathode electrode 31c and the mounting portion 410.

The first light emitting element 231 mounted on the first conductive pattern 241a is electrically coupled to the first conductive pattern 141a located at the −X direction side. Specifically, the anode electrodes 31b of the first light emitting element 231 are coupled to conducting portions 413 of the first conductive pattern 141a via metal wires 35, respectively. The metal wires 35 are provided by a wire bonding apparatus.

In this manner, the cathode electrode 31c of the first light emitting element 31 mounted on the first conductive pattern 41a and the anode electrode 31b of the first light emitting element 131 mounted on the first conductive pattern 141a are brought into a conductive state via the first conductive pattern 41a.

In addition, also between other first light emitting elements 31 adjacent to each other in the X-axis direction, the cathode electrode 31c of one of the first light emitting elements 31 and the anode electrode 31b of the other of the first light emitting elements 31 are electrically coupled to each other.

Among the plurality of first conductive patterns 41a arranged in the +X direction, one located at the extreme −X direction side, that is, at the head is electrically coupled to the coupling region 11a of the first interconnection 11. More specifically, the anode electrode 31b of the first light emitting element 31 mounted on leading one of the first conductive patterns 41a is electrically coupled to pad parts 11a1 of the coupling region 11a of the first interconnection 11 via the metal wires 35. In this way, the leading first conductive pattern 41a and the coupling region 11a of the first interconnection 11 are electrically coupled to each other via the first light emitting element 31 and the metal wires 35. Accordingly, a current can be supplied from the external device to the anode electrode 31b of the first light emitting element 31 mounted at the extreme −X direction side in the first light emitting element group 72A via the connector unit 78, the terminal part 77, and the first interconnection 11. In the first light emitting element group 72A, the plurality of first light emitting elements 31 has a structure in which the plurality of first light emitting elements 31 is coupled in series so that the current flows along the +X direction.

The second light emitting element group 72B is coupled in series to the first light emitting element group 72A. The second light emitting element group 72B has substantially the same configuration as that of the first light emitting element group 72A.

In the second light emitting element group 72B, the second element conducting part 42 has a plurality of second conductive patterns 42a. The second conductive patterns 42a are patterns separated from each other, and have the same shape. Each of the second conductive patterns 42a extends in the Z-axis direction crossing the −X direction. The plurality of second conductive patterns 42a are disposed to correspond respectively to the plurality of second light emitting elements 32, and each of the conductive patterns 42a extends in the Z-axis direction. That is, the number of the second conductive patterns 42a is the same as the number of the second light emitting elements 32. Each of the conductive patterns 42a is made of gold, copper, aluminum, or the like, and corresponds to a part of the conductive layer 752 that is shown in FIG. 4, and forms a part of the interconnection group 74.

The plurality of second conductive patterns 42a is patterns separated from each other, and the second conductive patterns 42a adjacent to each other in the X-axis direction are not in contact with each other.

The second conductive pattern 42a includes a mounting portion 420 on which the second light emitting element 32 is mounted, a pair of projecting portions 421 projecting on both sides of the mounting portion 420, a pair of coupling portions 422 that couple the pair of projecting portions 421 and the mounting portion 420, and a pair of conducting portions 423 that are disposed at the −X side of the pair of coupling portions 422 and are electrically coupled to the second light emitting element 32 mounted on the adjacent second conductive pattern 42a. Therefore, each of the second conductive patterns 42a has a shape extending at both sides in the Z-axis direction with respect to corresponding one of the second light emitting elements 32.

Between the second conductive patterns 42a adjacent to each other in the X-axis direction, the conducting portions 423 protruding from the second conductive pattern 42a at one side (+X side) are arranged so as to enter recesses 422a of the coupling portions 422 of the second conductive pattern 42a at the other side (−X side). As a result, between the second conductive patterns 42a adjacent to each other, the conducting portions 423 of the second conductive pattern 42a at the one side (+X side) are disposed near the mounting portion 420 of the second conductive pattern 42a at the other side (−X side).

Each of the second light emitting elements 32 is formed of a light emitting diode (LED) similarly to the first light emitting element 31. Therefore, the second light emitting element 32 includes a light emitting surface 32a, two anode electrodes 32b, and a single cathode electrode 32c.

Here, out of the two second conductive patterns 42*a* adjacent to each other in the X-axis direction, one on the right hand (+X side) is referred to as a second conductive pattern 142*a*, and one on the left hand (−X side) is referred to as a second conductive pattern 242*a*. Further, the second light emitting element 32 mounted on the second conductive pattern 142*a* is referred to as a second light emitting element 132, and the second light emitting element 32 mounted on the second conductive pattern 242*a* is referred to as a second light emitting element 232.

The second light emitting element 232 is mounted in a posture in which the cathode electrode 32*c* is placed on the mounting portion 420 of the second conductive pattern 242*a*. The second light emitting element 232 mounted on the second conductive pattern 242*a* is electrically coupled to the second conductive pattern 142*a* located at the +X direction side. Specifically, the anode electrodes 32*b* of the second light emitting element 232 are coupled to conducting portions 423 of the second conductive pattern 142*a* via the metal wires 35, respectively.

In this way, the cathode electrode 32*c* of the second light emitting element 32 mounted on the second conductive pattern 42*a* and the anode electrode 32*b* of the second light emitting element 132 mounted on the second conductive pattern 142*a* are brought into a conductive state via the second conductive pattern 42*a*.

In addition, also between other second light emitting elements 32 adjacent to each other in the X-axis direction, the cathode electrode 32*c* of one of the second light emitting elements 32 and the anode electrode 32*b* of the other of the second light emitting elements 32 are electrically coupled to each other.

Among the plurality of second conductive patterns 42*a* arranged in the −X direction, one located at the extreme +X direction side, that is, at the head is electrically coupled to the coupling region 12*a* of the second interconnection 12. More specifically, the anode electrode 32*b* of the second light emitting element 32 mounted on the leading second conductive pattern 42*a* is electrically coupled to a pad part 12*a*1 of the coupling region 12*a* of the second interconnection 12 via the metal wires 35. Thus, the anode electrode 32*b* of the second light emitting element 32 mounted at the extreme +X direction side in the second light emitting element group 72B is electrically coupled to the cathode electrode 31*c* of the first light emitting element 31 mounted at the extreme +X direction side in the first light emitting element group 72A via the second interconnection 12.

Further, one at the extreme −X direction side of the plurality of second conductive patterns 42*a* arranged in the −X direction, that is, the second conductive pattern 42*a* located at the rearmost position, is electrically coupled to the ground pattern GP provided to the base substrate 71. More specifically, the rearmost second conductive pattern 42*a* is coupled to the ground pattern GP via a pair of coupling regions 45.

Accordingly, in the second light emitting element group 72B, the plurality of second light emitting elements 32 has a structure in which the plurality of second light emitting elements 32 is coupled in series to each other so that the current flows along the −X direction.

Each of the coupling regions 45 is routed in the +X direction which is the inner side of the base substrate 71 from both ends in the Z-axis direction of the second conductive pattern 42*a* located at the rearmost side, and is then coupled to the ground pattern GP in the vicinity of the second interconnection 12. Here, when the coupling region 45 where the second conductive pattern 42*a* and the ground pattern GP are coupled to each other is extended toward the outside of the base substrate 71, there is a possibility that the base substrate 71 further grows in size. In the case of the present embodiment, since the coupling region 45 extends toward the inside of the base substrate 71, it is possible to suppress the growth in size of the base substrate 71.

As shown in FIG. 5, the second coupling part 76 has a line-symmetric structure with respect to the first coupling part 75 with reference to the central axis 71C of the base substrate 71. Specifically, the second coupling part 76 includes a third interconnection 13 and a fourth interconnection 14. The third interconnection 13 includes a coupling region 13*a* and a routing region 13*b*. The fourth interconnection 14 includes a coupling region 14*a* and a routing region 14*b*.

The coupling region 13*a* extends along the Z direction and is coupled to the +X side of the third light emitting element group 72C. Specifically, the coupling region 13*a* is coupled to the third element conducting part 43 of the third light emitting element group 72C. The routing region 13*b* of the third interconnection 13 is routed along the third light emitting element group 72C from the coupling region 13*a* and is coupled to the first terminal 77*a* of the terminal part 77.

The coupling region 14*a* of the fourth interconnection 14 extends along the coupling region 13*a* and is coupled to the −X side of the fourth light emitting element group 72D. Specifically, the coupling region 14*a* is coupled to the fourth element conducting part 44 of the fourth light emitting element group 72D. The routing region 14*b* of the fourth interconnection 14 is routed in the −X direction along the third light emitting element group 72C from the coupling region 14*a*, and is coupled to the −X side of the third light emitting element group 72C. Specifically, the routing region 14*b* is coupled to the third element conducting part 43 of the third light emitting element group 72C.

Based on such a configuration, in the third light emitting element group 72C, the plurality of third light emitting elements 33 has a structure in which the plurality of third light emitting elements 33 is coupled in series so that a current flows along the −X direction. In the fourth light emitting element group 72D, the plurality of fourth light emitting elements 34 has a structure in which the plurality of fourth light emitting elements 34 is coupled in series so that a current flows along the +X direction.

Referring back to FIG. 2, the support member 54 has a groove 154 that extends in the X-axis direction along the longitudinal direction of the wavelength conversion member 50 and houses a part of the wavelength conversion member 50, the wavelength conversion member 50 is disposed inside the groove 154, and the heat generated by the wavelength conversion member 50 is diffused to be released to the outside. It is therefore desirable for the support member 54 to be formed of a material that has predetermined strength and is high in thermal conductivity. It is desirable to use metal such as aluminum or stainless steel, in particular, an aluminum alloy such as a 6061 aluminum alloy as the material of the support member 54. A specific configuration of the support member 54 will be described later.

The wavelength conversion member 50 in the present embodiment includes a first protruding portion 151 which protrudes in the +X direction from the groove 154, and a second protruding portion 152 which protrudes in the −X direction from the groove 154.

The holding member 65 holds the first protruding portion 151 or the second protruding portion 152 protruding from the groove 154 of the support member 54. Therefore, the wavelength conversion member 50 is set in a state in which the wavelength conversion member 50 partially protrudes to the outside of the groove 154 of the support member 54 without having contact with a wall surface of the groove 154. The holding member 65 holds a portion of the wavelength conversion member 50 protruding to the outside of the groove 154. The holding member 65 regulates the position of the wavelength conversion member 50 with respect to the support member 54 in cooperation with the pair of pressing members 91, 92.

The pair of pressing members 91, 92 regulate the position in the Y-axis direction of the wavelength conversion member 50 with respect to the support member 54 inside the groove 154. The pressing member 91 corresponds to a "first regulatory member" in the appended claims, and the pressing member 92 corresponds to a "second regulatory member" in the appended claims.

The pair of pressing members 91, 92 are disposed to be opposed to a support surface 54s of the groove 154. Thus, the pair of pressing members 91, 92 restrict the movement of the wavelength conversion member 50 in the Y-axis direction in the groove 154. The pair of pressing members 91, 92 are made of an elastically deformable material. As an example, the pair of pressing members 91, 92 are each formed of a leaf spring made of a metal material, and are formed of stainless steel such as SUS 304.

The pair of pressing members 91, 92 are disposed between the wavelength conversion member 50 and the base substrate 71 and press the wavelength conversion member 50 against the support surface 54s of the groove 154 of the support member 54. The pair of pressing members 91, 92 are fixed to the support member 54. Although described in detail later, the pair of pressing members 91, 92 are disposed to overlap the first coupling part 75 and the second coupling part 76 in the gaps S1 and S2, respectively, in a plan view.

The mirror 53 is disposed on the second surface 50b of the wavelength conversion member 50. The mirror 53 reflects the fluorescence Y that has been guided through the interior of the wavelength conversion member 50 and has reached the second surface 50b. The mirror 53 is formed of a metal film or a dielectric multilayer film formed at the second surface 50b of the wavelength conversion member 50.

In the first illumination device 20, when the excitation light E emitted from the light source unit 70 enters the wavelength conversion member 50, the phosphor contained in the wavelength conversion member 50 is excited, and the fluorescence Y is emitted from random light emission points. The fluorescence Y travels omnidirectionally from the random light emission points, and the fluorescence Y traveling toward the four side surfaces 50c, 50d, 50e, and 50f travels toward the first surface 50a or the second surface 50b while repeating the total reflection at a plurality of places on the side surfaces 50c, 50d, 50e, and 50f. The fluorescence Y is guided and propagates through the interior of the wavelength conversion member 50 while being totally reflected, and exits via the first surface 50a. In the present embodiment, the fluorescence Y traveling toward the first surface 50a enters the angle conversion member 52 provided at the first surface 50a. The fluorescence Y traveling toward the second surface 50b is reflected by the mirror 53 and then travels toward the first surface 50a.

Out of the excitation light E having entered the wavelength conversion member 50, a part of the excitation light E that has not been used to excite the phosphor is reflected by members that are located around the wavelength conversion member 50, and include the light source unit 70, or the mirror 53 disposed on the second surface 50b. The part of the excitation light E is therefore confined in the wavelength conversion member 50 and reused.

The angle conversion member 52 is disposed on the first surface 50a of the wavelength conversion member 50. The angle conversion member 52 is formed of, for example, a tapered rod. The angle conversion member 52 has a plane of incidence of light 52a, on which the fluorescence Y emitted from the wavelength conversion member 50 is incident, a light exit surface 52b, through which the fluorescence Y is emitted, and a side surface 52c which reflects the fluorescence Y incident thereon toward the light exit surface 52b.

The angle conversion member 52 has a truncated quadrangular pyramidal shape, and the cross-sectional area perpendicular to an optical axis J of the angle conversion member 52 increases along the traveling direction of the light. Therefore, the area of the light exit surface 52b is greater than the area of the plane of incidence of light 52a. An axis that passes through the centers of the light exit surface 52b and the plane of incidence of light 52a, and is parallel to the X axis is defined as the optical axis J of the angle conversion member 52. The optical axis J of the angle conversion member 52 coincides with the optical axis AX1 of the first illumination device 20.

The fluorescence Y having entered the angle conversion member 52 changes its orientation while traveling through the interior of the angle conversion member 52 so as to approximate to the direction parallel to the optical axis J every time the fluorescence Y is totally reflected by the side surface 52c. In such a manner, the angle conversion member 52 converts the exit angle distribution of the fluorescence Y emitted from the first surface 50a of the wavelength conversion member 50. Specifically, the angle conversion member 52 makes the maximum exit angle of the fluorescence Y at the light exit surface 52b smaller than the maximum incident angle of the fluorescence Y at the plane of incidence of light 52a.

In general, since the etendue of light specified by the product of the area of a light exit region and the maximum exit angle, which is the solid angle of the light, is preserved, the etendue of the fluorescence Y is preserved around the transmission of the fluorescence Y through the angle conversion member 52. The angle conversion member 52 has the configuration in which the area of the light exit surface 52b is greater than the area of the plane of incidence of light 52a as described above. Therefore, from the viewpoint of the etendue preservation, the angle conversion member 52 can therefore make the maximum exit angle of the fluorescence Y at the light exit surface 52b smaller than the maximum incident angle of the fluorescence Y at the plane of incidence of light 52a.

The angle conversion member 52 is fixed to the wavelength conversion member 50 via an optical adhesive not shown so that the plane of incidence of light 52a is opposed to the first surface 50a of the wavelength conversion member 50. That is, the angle conversion member 52 and the wavelength conversion member 50 are in contact with each other via the optical adhesive, and an air gap such as an air layer is not disposed between the angle conversion member 52 and the wavelength conversion member 50. When an air gap is disposed between the angle conversion member 52 and the wavelength conversion member 50, the fluorescence Y incident on the plane of incidence of light 52a at an angle greater than the critical angle out of the fluorescence Y having reached the plane of incidence of light 52a of the angle conversion member 52 is totally reflected by the plane of incidence of light 52a and cannot enter the angle conversion member 52. In contrast, when there is no air gap between the angle conversion member 52 and the wavelength conversion member 50 as in the present embodiment, the amount of lost component of the fluorescence Y that cannot enter the angle conversion member 52 due to the total reflection can be reduced. From the viewpoint described above, it is desirable that the refractive index of the angle conversion member 52 and the refractive index of the wavelength conversion member 50 are made coincide with each other as precise as possible.

As the angle conversion member 52, a compound parabolic concentrator (CPC) may be used instead of the tapered rod. Substantially the same advantages as those when using the tapered rod can be obtained when using the CPC as the angle conversion member 52. It should be noted that the light source device 100 may not necessarily include the angle conversion member 52.

The collimating optical system 63 is formed of a collimator lens and so on, and is disposed between the light source device 100 and the integrator optical system 80. The collimating optical system 63 further narrows the angular distribution of the fluorescence Y emitted from the light source device 100 to make the fluorescence Y high in degree of parallelism enter the integrator optical system 80. It should be noted that the collimating optical system 63 may not be provided when the fluorescence Y emitted from the angle conversion member 52 is sufficiently high in degree of parallelism.

The integrator optical system 80 includes a first lens array 61 and a second lens array 101. The integrator optical system 80 functions as a homogenous illumination optical system that homogenizes the intensity distribution of the fluorescence Y emitted from the light source device 100 in each of the light modulation devices 4R, 4G, which are illumination target regions in cooperation with the superimposing optical system 103. The fluorescence Y emitted from the collimating optical system 63 enters the first lens array 61. Along with the second lens array 101 disposed in a posterior stage of the light source device 100, the first lens array 61 forms the integrator optical system 80.

The first lens array 61 includes a plurality of first small lenses 61a. The plurality of first small lenses 61a is arranged in a matrix in a plane parallel to the Y-Z plane perpendicular to the optical axis AX1 of the first illumination device 20. The plurality of first small lenses 61a divides the fluorescence Y emitted from the angle conversion member 52 into a plurality of partial fluxes. The first small lenses 61a each have a rectangular shape substantially similar to the shape of the image formation region of each of the light modulation devices 4R, 4G. Thus, the partial fluxes emitted from the first lens array 61 are each efficiently incident on the image formation region of each of the light modulation devices 4R, 4G.

The fluorescence Y emitted from the first lens array 61 travels toward the second lens array 101. The second lens array 101 is disposed to be opposed to the first lens array 61. The second lens array 101 includes a plurality of second small lenses 101a corresponding to the plurality of first small lenses 61a of the first lens array 61. The second lens array 101 forms images of the plurality of first small lenses 61a of the first lens array 61 in the vicinity of the image formation region of each of the light modulation devices 4R, 4G in cooperation with the superimposing optical system 103. The plurality of second small lenses 101a is arranged in a matrix in a plane parallel to the Y-Z plane perpendicular to the optical axis AX1 of the first illumination device 20.

The first small lenses 61a of the first lens array 61 and the second small lenses 101a of the second lens array 101 are the same in size as each other in the present embodiment, but may be different in size from each other. Further, the first small lenses 61a of the first lens array 61 and the second small lenses 101a of the second lens array 101 are arranged at positions where the optical axes thereof coincide with each other in the present embodiment, but may be arranged at positions where the optical axes thereof deviate from each other.

The polarization conversion element 102 converts the polarization direction of the fluorescence Y emitted from the second lens array 101. Specifically, the polarization conversion element 102 converts each of the partial fluxes of the fluorescence Y divided by the first lens array 61 and then emitted from the second lens array 101 into linearly polarized light.

The polarization conversion element 102 includes a polarization separation layer that is not shown, and that directly transmits one linear polarization component out of the polarization components provided in the fluorescence Y emitted from the light source device 100 and reflects the other linear polarization component toward a direction perpendicular to the optical axis AX1, a reflecting layer that is not shown, and that reflects the other linear polarization component reflected by the polarization separation layer, toward a direction parallel to the optical axis AX1, and a wave plate that is not shown, and that converts the other linear polarization component reflected by the reflecting layer into the one linear polarization component.

The fluorescence Y transmitted through the polarization conversion element 102 enters the superimposing optical system 103. The superimposing optical system 103 forms a homogenous illumination optical system that homogenizes the intensity distribution of the fluorescence Y in each of the light modulation devices 4R, 4G which are the illumination target regions in cooperation with the integrator optical system 80.

In the light source device 100 in the present embodiment, when emitting the excitation light E, the light emitting element groups 72A, 72B, 72C, and 72D of the light source unit 70 generate heat. In each of the light emitting element groups 72A, 72B, 72C, and 72D, when the temperature of the light emitting element formed of an LED rises, the emission wavelength increases to decrease the intensity of the light having the desired wavelength. In addition, regarding the LED, the lower the operating temperature, the higher the luminous efficiency, and the longer lifetime can be achieved.

In the light source device 100 in the present embodiment, the light emitting elements of the light emitting element groups 72A, 72B, 72D are efficiently cooled. The description will hereinafter be presented citing when cooling the first light emitting elements 31 of the first light emitting element group 72A as an example.

For example, the heat of the first light emitting element 31 of the first light emitting element group 72A is transferred to the base 750 of the base substrate 71 via the first conductive pattern 41a. In the present embodiment, as shown in FIG. 6, the first conductive pattern 41a has a shape extending to both sides in the Z-axis direction with respect to the first light emitting element 31. Therefore, the first conductive pattern 41a is capable of transferring the heat of the first light emitting elements 31 to the base 750 side in a state in which the heat is spread to the surrounding area compared to when the first conductive pattern 41a is substantially the same in size as the first light emitting element 31. Accordingly, the first conductive pattern 41a is capable of efficiently cooling the first light emitting element 31.

Further, in the present embodiment, the first conductive patterns 41a have the same shape. Accordingly, the heat radiation performance of the first light emitting elements 31 in the first conductive pattern 41a is made substantially uniform. This makes it difficult for a variation in cooling performance between the plurality of first light emitting elements 31 to occur. By suppressing the temperature difference between the first light emitting elements 31 in such a manner, it is possible to suppress the illuminance unevenness of the excitation light E emitted from the first light emitting element group 72A.

The same applies to other light emitting element groups 72B, 72C, and 72D. Therefore, the second light emitting elements 32, the third light emitting elements 33, and the fourth light emitting elements 34 can efficiently be cooled. In addition, the illuminance unevenness of the excitation light E emitted from the light emitting element groups 72B, 72C, and 72D can be suppressed.

In the light source device 100 according to the present embodiment, it is preferable to obtain bright fluorescence Y by efficiently making the excitation light E incident on the wavelength conversion member 50.

In order to allow the excitation light E to efficiently enter the wavelength conversion member 50, it is desirable to dispose the base substrate 71 and the wavelength conversion member 50 as close as possible. When the base substrate 71 and the wavelength conversion member 50 are made close to each other, the pressing members 91, 92 located between the wavelength conversion member 50 and the base substrate 71 may come into contact with any one of the light emitting elements of the light emitting element groups 72A, 72B, 72C, and 72D.

In contrast, in the case of the light source device 100 according to the present embodiment, in a state of a plan view, one pressing member 91 is disposed to overlap the first coupling part 75 in the gap S1 provided on the base substrate 71 and the other pressing member 92 is disposed to overlap the second coupling part 76 in the gap S2 provided on the base substrate 71. Since the gaps S1, S2 are arranged line-symmetrically with reference to the central axis 71C of the base substrate 71, by aligning the center of the base substrate 71 with the center of the wavelength conversion member 50, the pair of pressing members 91, 92 can be arranged in a well-balanced manner in the length direction of the wavelength conversion member 50 with respect to the center of the wavelength conversion member 50. Thus, the pair of pressing members 91, 92 can stably hold the wavelength conversion member 50 in the groove 154.

Since the light emitting element is not disposed in the gap S1 in which the pressing member 91 is disposed as described above, the pressing member 91 does not block the light from the light emitting element. Similarly, since the light emitting element is not disposed in the gap S2 in which the pressing member 92 is disposed as described above, the pressing member 92 does not block the light from the light emitting element.

In addition, by the pressing member 91 entering the gap S1, the first light emitting element group 72A, the second light emitting element group 72B, and the wavelength conversion member 50 can be disposed closer to each other in the Y-axis direction. Similarly, by the pressing member 92 entering the gap S2, the third light emitting element group 72C, the fourth light emitting element group 72D, and the wavelength conversion member 50 can be disposed closer to each other in the Y-axis direction.

As described above, in the light source device 100 according to the present embodiment, by making the positions of the pair of pressing members 91, 92 coincide with the positions of the gaps S1, S2, it is possible to further reduce the size of the device configuration by efficiently using the space on the first surface 71a of the base substrate 71.

Therefore, according to the light source device 100 in the present embodiment, it is possible to realize a configuration of generating the bright fluorescence Y by efficiently making the excitation light E incident on the wavelength conversion member 50 while achieving the reduction in size of the device configuration.

Figure 7:
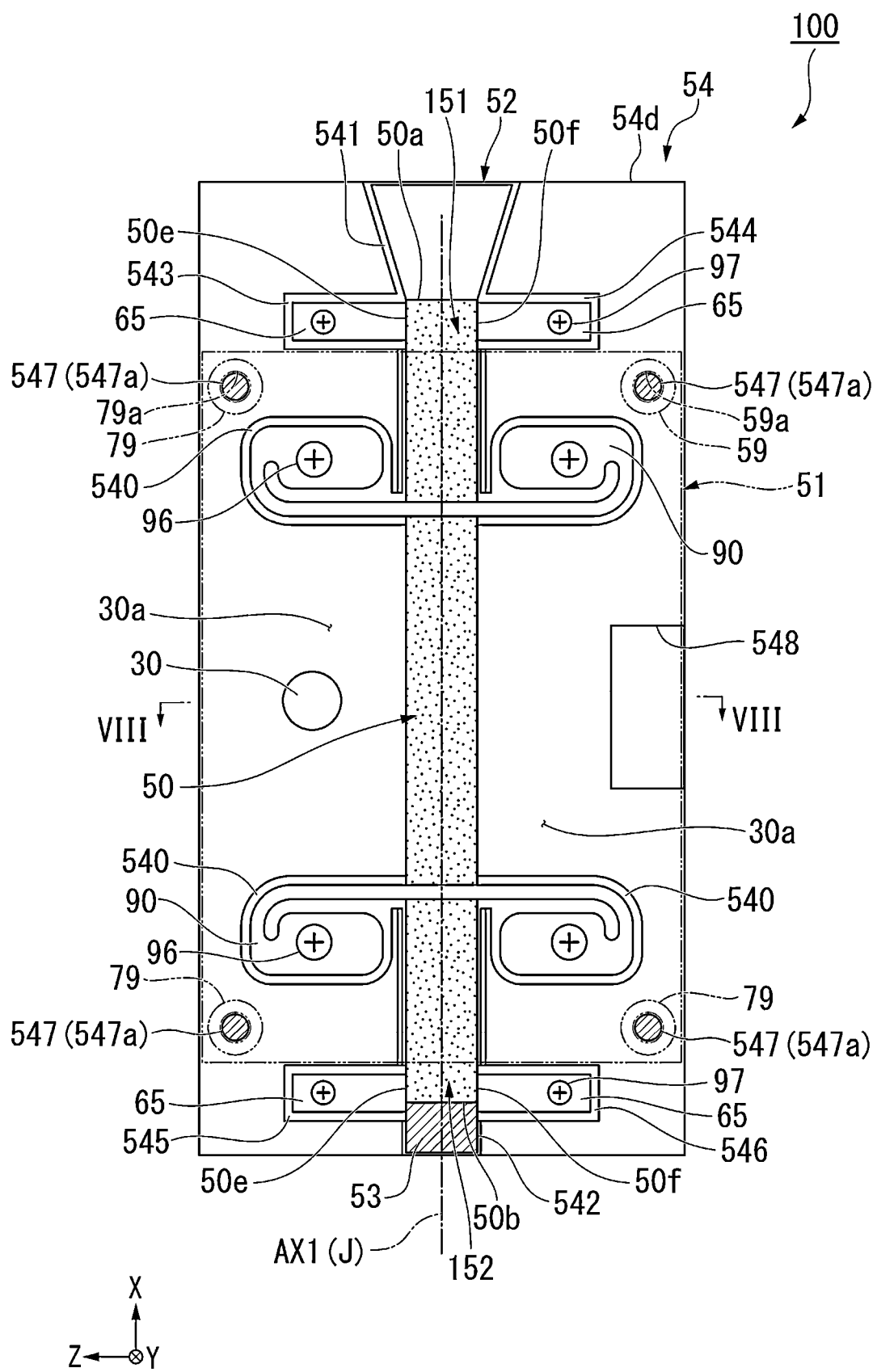
FIG. 7 is a plan view of the light source device viewed from a Y-axis direction.

FIG. 7 is a plan view of the light source device 100 viewed from the Y-axis direction. In FIG. 7, in order to make the drawing eye-friendly, the light source unit 70 is represented by a dashed-two dotted line. In FIG. 7, illustration of the light emitting element groups 72A, 72B, 72C, and 72D is omitted.

As illustrated in FIG. 7, the light source device 100 according to the present embodiment includes a convex portion 30 that brings the base substrate 71 and the support member 54 into contact with each other. Specifically, the convex portion 30 is disposed on an opposed surface 30a of the support member 54 opposed to the first surface 71a of the base substrate 71. The convex portion 30 brings the base substrate 71 and the support member 54 into contact with each other in a state in which the light source unit 70 is separated from the support member 54 and the wavelength conversion member 50.

As shown in FIG. 3, the convex portion 30 and the terminal part 77 are arranged to be opposite to each other across the light emitting element groups 72A, 72B, 72C, and 72D. Here, there will be considered when the convex portion 30 and the terminal part 77 are disposed at one side of the respective light emitting element groups 72A, 72B, 72C, and 72D. In this case, since there arises a necessity that the convex portion 30 is disposed at a position where the convex portion 30 does not interfere with the terminal part 77, there is a possibility that the base substrate 71 grows in size in order to ensure a space for separately disposing the convex portion 30. In contrast, according to the configuration of the present embodiment, as shown in FIG. 3, the convex portion 30 can be disposed at an opposite side to the terminal part 77, and in an area with a margin, and therefore, by efficiently using a space on the first surface 71a of the base substrate 71, a reduction in size of the light source device 100 can be realized.

In addition to the convex portion 30, the support member 54 includes spring fixation parts 540, a first housing portion 541, a second housing portion 542, a third housing portion 543, a fourth housing portion 544, a fifth housing portion 545, a sixth housing portion 546, a light source fixation part 547, and a cutout portion 548.

The spring fixation parts 540 are disposed at both sides of the groove 154 in the Z-axis direction along a transverse direction of the wavelength conversion member 50. The spring fixation parts 540 fix both end portions of the pressing members 91, 92 disposed in a state of straddling the wavelength conversion member 50 in the Z-axis direction with screws 96. The cutout portion 548 is for suppressing interference with the connector unit 78 provided to the base substrate 71 when the light source unit 70 is fixed to the support member 54.

The convex portion 30 is disposed at an inner peripheral side of the base substrate 71 with respect to the fixation part 79. Here, the inner peripheral side of the base substrate 71 with respect to the fixation part 79 means the inside of an imaginary line passing through the centers of the four through holes 79a forming the fixation part 79. That is, it can be rephrased that the convex portion 30 is disposed at a position closer to the center of the base substrate 71 than the fixation part 79.

The convex portion 30 is a protruding body that protrudes in the −Y direction from the support member 54. The convex portion 30 may be formed integrally with the support member 54 or may be formed of a member independent of the support member 54. In the case of the present embodiment, the convex portion 30 is formed integrally with the support member 54.

The convex portion 30 is disposed at a position where the convex portion 30 does not overlap the light emitting elements of the light emitting element groups 72A, 72B, 72C, and 72D in a plan view in the Y direction that is the normal direction of the opposed surface 30a of the support member 54, and does not have contact with the wavelength conversion member 50. According to this configuration, it is possible to prevent an occurrence of a problem such as damage of the light emitting surface due to the convex portion 30 making contact with the light emitting surface of the light emitting element, or an interference of the incidence of the excitation light E emitted from the light emitting surface on the wavelength conversion member 50 by the convex portion 30.

According to the light source device 100 in the present embodiment, the light source unit 70 and the support member 54 are in contact with each other via the convex portion 30 disposed between the base substrate 71 and the support member 54. The convex portion 30 functions as a spacer that regulates the distance between the light source unit 70 and the support member 54 in the Y-axis direction that is the stacking direction of the light source unit 70 and the support member 54. The convex portion 30 at least has such rigidity that the convex portion 30 does not deform in a state of being sandwiched between the light source unit 70 and the support member 54.

In a state where the base substrate 71 is fixed to the support member 54, that is, in a state where the fixation part 79 of the base substrate 71 is fixed to the light source fixation part 547 of the support member 54 with screws, the convex portion 30 is inserted into the concave portion 60 formed at the first surface 71a of the base substrate 71. The convex portion 30 is in contact with the first insulating layer 751 exposed in the concave portion 60 shown in FIG. 4.

Here, the flatness of the first insulating layer 751 covering the obverse surface 750a of the base 750 is higher than the flatness of the second insulating layer 753 covering the conductive layer 752. In the case of the embodiment, since the convex portion 30 is in present contact with the first insulating layer 751 higher in flatness than the second insulating layer 753, the support member 54 and the base substrate 71 adhere to each other in good condition via the convex portion 30.

The height in the Y direction of the convex portion 30 is higher than the height in the Y direction of the pressing members 91, 92 having contact with the third surface 50c of the wavelength conversion member 50. The convex portion 30 further protrudes toward the light source unit 70 than the pressing members 91, 92 to thereby bring the pressing members 91, 92 and the light source unit 70 into a separated state. The pressing members 91, 92 are not in contact with the first surface 71a of the base substrate 71 of the light source unit 70. For this reason, it is possible to prevent the occurrence of a problem that the conductive layer 752 shown in FIG. 4 is broken or short-circuited due to the pressing members 91, 92 applying pressure to the first surface 71a.

The light source fixation part 547 includes a plurality of pedestals 547a. The plurality of pedestals 547a corresponds to the plurality of through holes 79a of the fixation part 79 of the base substrate 71. That is, the number of the pedestals 547a of the light source fixation part 547 and the number of the through holes 79a of the fixation part 79 are the same. Each of the pedestals 547a is provided with an internal thread for fixing a screw inserted into the through hole 79a corresponding thereto.

In a direction along the Y axis, the pedestals 547a are equal in height, and the height of the convex portion 30 is substantially equal to the height of the pedestals 547a. For example, when the gap between the light emitting elements of the light emitting element groups 72A, 72B, 72C, and 72D and the third surface 50c of the wavelength conversion member 50 is 0.3 mm, the tolerance of the pedestals 547a and the convex portion 30 is set to ±0.1 mm or less.

In the case of the base substrate 71 in the present embodiment, the convex portion 30 is in contact with the first insulating layer 751 exposed in the concave portion 60 as described above, but it is arranged that the first insulating layer 751 is exposed with respect to the fixation part 79 which the pedestals 547a the same in height as the convex portion 30 have contact with.

By making the height of the pedestals 547a and the height of the convex portion 30 uniform, and making the pedestals 547a and the convex portion 30 have contact with the first insulating layer 751 as described above, the base substrate 71 and the support member 54 are supported in a stable state without rattling via the convex portion 30 and the light source fixation part 547.

Figure 8:
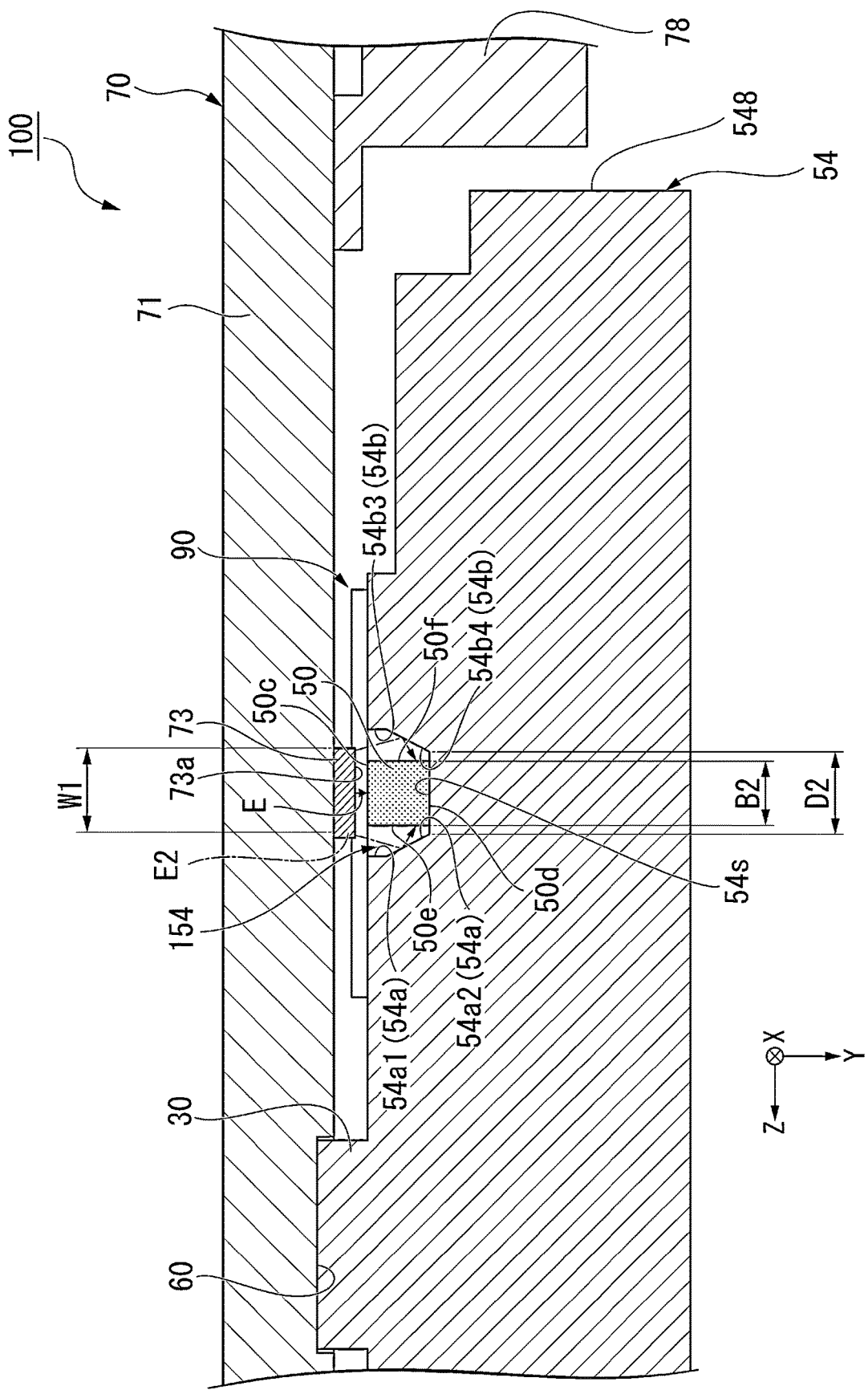
FIG. 8 is a cross-sectional view of the light source device taken along the line VIII-VIII in FIG. 7.

FIG. 8 is a cross-sectional view of the light source device 100 taken along the line VIII-VIII of FIG. 7.

As illustrated in FIG. 8, according to the light source device 100 in the present embodiment, the base substrate 71 and the support member 54 are in contact with each other by the convex portion 30 located at the inner peripheral side of the fixation part 79. Therefore, the warpage of the base substrate 71 toward the wavelength conversion member 50 side is suppressed. Accordingly, in the light source device 100 in the present embodiment, by appropriately maintaining the distance between the light source unit 70 and the third surface 50c of the wavelength conversion member 50, it is possible to generate the bright fluorescence Y by efficiently making the excitation light E incident on the wavelength conversion member 50, and at the same time, it is possible to prevent an occurrence of a problem such as cracks and damage caused by the contact between the light source unit 70 and the wavelength conversion member 50.

Further, the groove 154 of the support member 54 has a U-shaped cross section perpendicular to the X-axis direction. The groove 154 has the support surface 54s, a first wall surface 54a, and a second wall surface 54b.

The support surface 54s corresponds to a bottom surface of the groove 154. In the case of the present embodiment, the support surface 54s is a surface extending in parallel to the X-Z plane and supports the fourth surface 50d of the wavelength conversion member 50. The first wall surface 54a corresponds to one side surface of the groove 154, and is opposed to the fifth surface 50e of the wavelength conversion member 50, and is separated from the fifth surface 50e. That is, a gap is provided between the first wall surface 54a and the fifth surface 50e of the wavelength conversion member 50. The second wall surface 54b corresponds to the other side surface of the groove 154, and is opposed to the sixth surface 50f of the wavelength conversion member 50, and is separated from the sixth surface 50f.

That is, a gap is provided between the second wall surface 54b and the sixth surface 50f of the wavelength conversion member 50.

The first wall surface 54a includes a first part 54a1 located at the third surface 50c side, and a second part 54a2 located at the support surface 54s side. The first part 54a1 extends in a direction perpendicular to the support surface 54s, that is, in parallel to the X-Y plane. The second part 54a2 inclines so as to approach the fifth surface 50e as extending from the first part 54a1 side toward the support surface 54s. In other words, the distance between the second part 54a2 and the fifth surface 50e at the support surface 54s side is shorter than the distance between the second part 54a2 and the fifth surface 50e at the first part 54a1 side.

The second wall surface 54b includes a third part 54b3 located at the third surface 50c side, and a fourth part 54b4 located at the support surface 54s side. The third part 54b3 extends in a direction perpendicular to the support surface 54s, that is, in parallel to the X-Y plane. The fourth part 54b4 inclines so as to approach the sixth surface 50f as extending from the third part 54b3 side toward the support surface 54s. In other words, the distance between the fourth part 54b4 and the sixth surface 50f at the support surface 54s side is shorter than the distance between the fourth part 54b4 and the sixth surface 50f at the third part 54b3 side.

The first wall surface 54a and the second wall surface 54b are each formed of a surface of the metal such as aluminum or stainless steel as the constituent material of the support member 54. More specifically, the first wall surface 54a and the second wall surface 54b are each formed of a processed surface obtained by performing a mirror finishing treatment on the metal surface described above. Therefore, the first wall surface 54a and the second wall surface 54b each have light reflectivity and reflect the excitation light E incident thereon. Note that the first wall surface 54a and the second wall surface 54b may each be formed of another metal film, or a dielectric multilayer film formed at the surface of the metal such as aluminum or stainless steel.

Since the first wall surface 54a and the second wall surface 54b of the groove 154 need to go through the mirror finishing treatment as described above, a region provided with the groove 154 is required to be higher in processing accuracy compared to other regions of the support member 54. Therefore, it is possible to form a portion of the support member 54 where the groove 154 is provided with a separate member, and then combine the portion with a separate member provided with other portions than the groove 154 to form a single support member 54. That is, the support member 54 may be formed by combining a plurality of members with each other. In this way, since the peripheral region of the groove 154 is formed of a separate member, it is possible to increase the workability and the processing accuracy of the first wall surface 54a and the second wall surface 54b of the groove 154.

Hereinafter, the light emitting elements of the light emitting element groups 72A, 72B, 72C, and 72D will be simply referred to as light emitting elements 73 unless particularly distinguished. A dimension W1 along the Z-axis direction of the light emitting elements 73 of the light emitting element groups 72A, 72B, 72C, and 72D is larger than a width B2 along the Z-axis direction of the wavelength conversion member 50. Note that the width in the Z-axis direction of the wavelength conversion member 50 in the present embodiment is uniform over the entire length in the longitudinal direction.

Thus, in the Z-axis direction, both end portions of a light emitting surface 73a of the light emitting element 73 protrude outside the third surface 50c of the wavelength conversion member 50. Specifically, both the end positions of the light emitting surface 73a of the light emitting element 73 protrude to positions overlapping a gap between the fifth surface 50e and the first wall surface 54a and a gap between the sixth surface 50f and the second wall surface 54b. In other words, when the light emitting surface 73a is viewed from the support surface 54s along the Y-axis direction, a part of the light emitting surface 73a overlaps the third surface 50c, another part of the light emitting surface 73a overlaps the gap between the fifth surface 50e and the first wall surface 54a and the gap between the sixth surface 50f and the second wall surface 54b.

A first width D2 along the Z-axis direction of the support surface 54s of the support member 54 is larger than the width B2 along the Z-axis direction of the wavelength conversion member 50. Thus, in the Z-axis direction, both the end portions of the support surface 54s protrude outside the fourth surface 50d of the wavelength conversion member 50. In other words, when the support surface 54s is viewed from the light emitting surface 73a along the Y-axis direction, a part of the support surface 54s overlaps the fourth surface 50d, and another part of the support surface 54s is exposed outside the fourth surface 50d. As described above, the support surface 54s has an exposed portion exposed outside the wavelength conversion member 50.

According to the light source device 100 in the present embodiment, the excitation light E2 emitted from the light emitting surface 73a of the light emitting element 73 as partial excitation light E2 travels through the gap between the fifth surface 50e of the wavelength conversion member 50 and the first part 54a1, and is then incident on the second part 54a2, which inclines with respect to the support surface 54s. On this occasion, the excitation light E2 is reflected by the second part 54a2 and is then incident on the fifth surface 50e of the wavelength conversion member 50. As described above, since the excitation light E2 passing through the gap between the fifth surface 50e of the wavelength conversion member 50 and the first wall surface 54a becomes easy to enter the fifth surface 50e, it is possible to reduce an amount of the excitation light E that is reflected by the support surface 54s and then returns toward the light source unit 70. Further, a part of the excitation light E is reflected by the first part 54a1 which extends perpendicularly to the support surface 54s, and is then incident on the fifth surface 50e of the wavelength conversion member 50. Thus, it is possible to realize the light source device 100 which is high in use efficiency of the excitation light E, and is easy to obtain the fluorescence Y having the desired intensity.

Referring back to FIG. 7, the first housing portion 541 is a concave portion that communicates with a +X direction side of the groove 154. The first housing portion 541 penetrates up to an outer edge 54d of the support member 54. The first housing portion 541 houses the first protruding portion 151 of the wavelength conversion member 50 which protrudes from the groove 154. Further, the first housing portion 541 holds the angle conversion member 52 fixed to the first surface 50a of the wavelength conversion member 50. In the present embodiment, the angle conversion member 52 fixed to the first surface 50a of the first protruding portion 151 is held by the support member 54.

The light exit surface 52b of the angle conversion member 52 housed in the first housing portion 541 is coplanar with the outer edge 54d of the support member 54 in the plan view.

The second housing portion 542 is a concave portion that communicates with the −X direction side of the groove 154.

The second housing portion 542 penetrates up to the outer edge 54d of the support member 54. The second housing portion 542 houses the second protruding portion 152 of the wavelength conversion member 50, which protrudes from the groove 154. The second housing portion 542 is disposed in a state of not communicating with the outer edge 54d of the support member 54. The second housing portion 542 houses the second protruding portion 152 of the wavelength conversion member 50, which protrudes from the groove 154. In the present embodiment, the mirror 53 is disposed on the second surface 50b of the second protruding portion 152. The second housing portion 542 houses the mirror 53 disposed on the second surface 50b of the wavelength conversion member 50.

The third housing portion 543 is a concave portion that communicates with the +Z direction side of the first housing portion 541. The third housing portion 543 houses the holding member 65 that holds the +Z side of the first protruding portion 151 of the wavelength conversion member 50 housed in the first housing portion 541.

The fourth housing portion 544 is a concave portion that communicates with the −Z direction side of the first housing portion 541. The fourth housing portion 544 houses the holding member 65 that holds the −Z side of the first protruding portion 151 of the wavelength conversion member 50 housed in the first housing portion 541.

The fifth housing portion 545 is a concave portion that communicates with the +Z direction side of the second housing portion 542. The fifth housing portion 545 houses the holding member 65 that holds a portion of the +Z side of the second protruding portion 152 of the wavelength conversion member 50 housed in the second housing portion 542.

The sixth housing portion 546 is a concave portion that communicates with the −Z direction side of the third housing portion 543. The sixth housing portion 546 houses the holding member 65 that holds the −Z side of the second protruding portion 152 of the wavelength conversion member 50 housed in the second housing portion 542.

The positions in the Z-axis direction of the pair of holding members 65 which sandwich the first protruding portion 151 and the second protruding portion 152 of the wavelength conversion member 50 from both sides are made adjustable.

In this way, the wavelength conversion member 50 in the present embodiment is held in the groove 154 in a state in which the movement in the Z-axis direction in the first protruding portion 151 and the second protruding portion 152 protruding outside the groove 154 is restricted by the holding members 65.

As described above, the light source device 100 according to the present embodiment includes the light source unit 70 including the base substrate 71, the first light emitting element group 72A and the second light emitting element group 72B disposed on the base substrate 71 with the gap S1, and the first coupling part 75 disposed in the gap S1 and electrically coupling the first light emitting element group 72A and the second light emitting element group 72B, the wavelength conversion member 50 for guiding the excitation light E emitted from the light source unit 70, the support member 54 which supports the wavelength conversion member 50, and to which the base substrate 71 of the light source unit 70 is fixed, and the pressing member 91 which is disposed between the wavelength conversion member 50 and the base substrate 71 and regulates the position of the wavelength conversion member 50 with respect to the support member 54. The first light emitting element group 72A has the configuration in which the plurality of first light emitting elements 31 is coupled in series so that the current flows along the +X direction. The second light emitting element group 72B has the configuration in which the plurality of second light emitting elements 32 is coupled in series so that the current flows along the −X direction. In a plan view, the pressing member 91 is disposed to overlap the first coupling part 75 in the gap S1.

According to the light source device 100 in the present embodiment, by making the position at which the pressing member 91 is disposed, and the position of the gap S1 coincide with each other, it is possible to reduce the size of the device configuration by efficiently using the space on the first surface 71a of the base substrate 71.

Further, in the light source device 100 in the present embodiment, for example, by adjusting the numbers of the light emitting elements constituting the first light emitting element group 72A and the second light emitting element group 72B without changing the total sum of the light emitting elements constituting the first light emitting element group 72A and the second light emitting element group 72B, it is possible to easily change the position of the gap S1 on the base substrate 71. Therefore, according to the light source device 100 in the present embodiment, it is possible to reduce the size of the device configuration while increasing the degree of freedom of the arrangement place of the pressing member 91.

Since the projector 1 according to the present embodiment includes the light source device 100 that is small in size, and efficiently extracts the bright fluorescence Y from the wavelength conversion member 50, it is possible to provide a projector which is excellent in light use efficiency and is small in size.

First Modified Example

A first modified example of the present embodiment will hereinafter be described.

Figure 9:
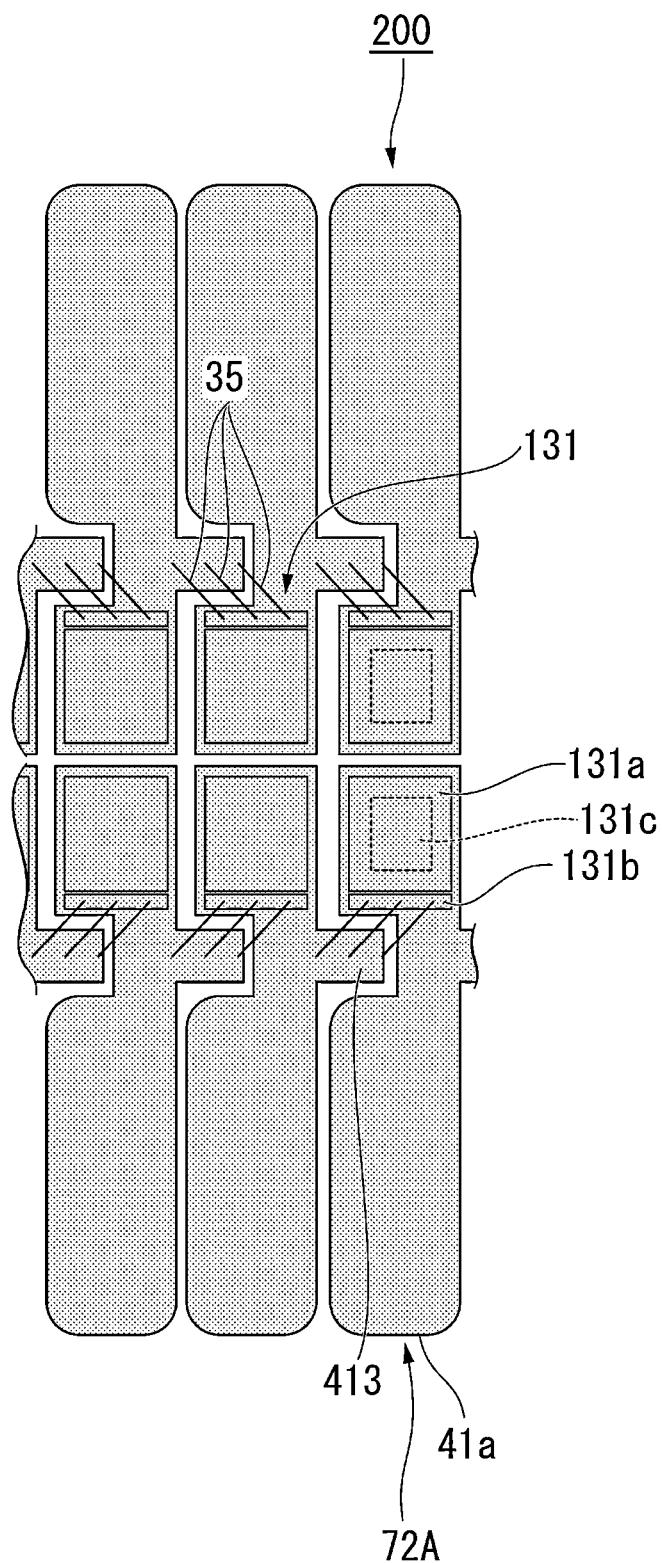
FIG. 9 is a plan view showing a configuration of a main part of a light source device according to a first modified example.

FIG. 9 is a plan view showing a configuration of a main part of a light source device according to the first modified example. In the following drawing, elements common to those of the light source device 100 according to the embodiment described above are denoted by the same reference symbols, and the description thereof will be omitted.

In the case of the light source device 200 according to the present modified example, for example, two first light emitting elements 131 are mounted on each of the first conductive patterns 41a of the first light emitting element group 72A. Similarly, two light emitting elements are mounted on each of the conductive patterns of other light emitting element groups 72B through 72D. The description will hereinafter be presented citing the configuration of the first light emitting element 131 as an example.

The first light emitting element 131 is formed of a light emitting diode (LED), and includes a light emitting surface 131a, a single anode electrode 131b, and a single cathode electrode 131c. In the first light emitting element 131, the light emitting surface 131a and the single anode electrode 131b are disposed on an obverse surface facing to an opposite side to the base substrate 71 and the cathode electrode 131c is disposed on a reverse surface facing to the base substrate 71 side opposite to the obverse surface.

The anode electrode 131b of the first light emitting element 131 in the present modified example has a rectangular shape extending along one side of the light emitting surface 131a. According to the first light emitting element 131 of the present modified example, a plurality of (three in FIG. 9) metal wires 35 can be used when electrically coupling the anode electrode 131b and the conducting portion 413 of the first conductive pattern 41a.

According to this configuration, since the current can be supplied to the light emitting surface 131a of each first light emitting elements 131 via the three metal wires 35, the density of the current to be supplied to the light emitting surface 131a stabilizes, and thus, it is possible to homogenously emit the excitation light E from the light emitting 131a. Accordingly, it is possible for each of the first light emitting elements 131 to emit the homogenous and bright excitation light from the light emitting surface 131a.

Second Modified Example

A second modified example of the present embodiment will hereinafter be described.

Figure 10:
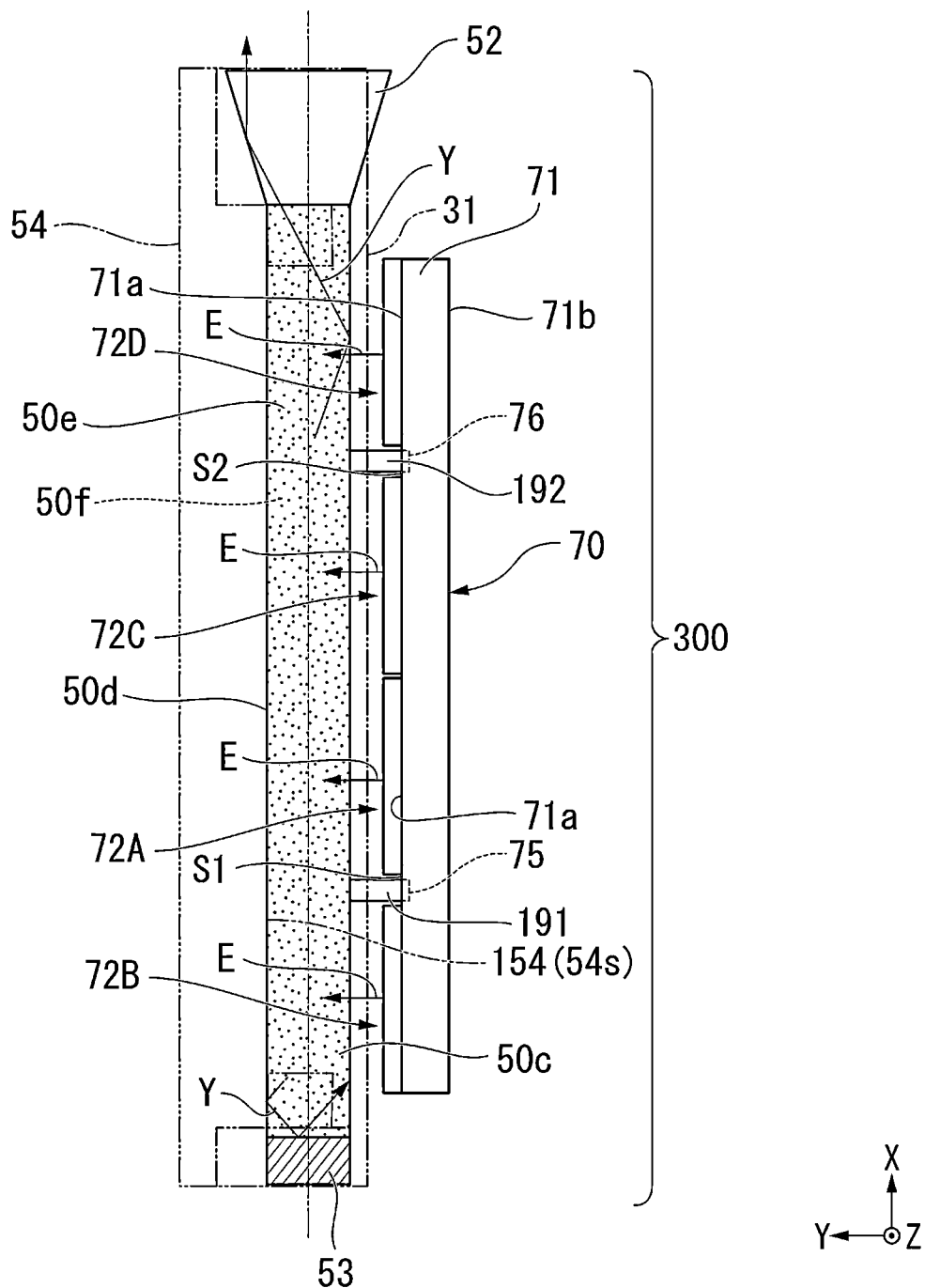
FIG. 10 is a diagram showing a configuration of a main part of a light source device according to a second modified example.

FIG. 10 is a diagram showing a configuration of a main part of a light source device according to the second modified example. In the following drawing, elements common to those of the light source device 100 according to the embodiment described above are denoted by the same reference symbols, and the description thereof will be omitted.

There is cited when the pair of pressing members 91, 92 are provided to the support member 54 as the regulatory members for regulating the position of the wavelength conversion member 50 with respect to the groove 154 as an example in the case of the embodiment described above, but the present disclosure is not limited thereto. For example, the regulatory members may be provided to the light source unit 70.

As illustrated in FIG. 10, in the light source device 300 according to the present modified example, a first regulatory member 191 and a second regulatory member 192 are respectively disposed in the gaps S1, S2 disposed on the base substrate 71. The first regulatory member 191 is disposed to overlap the first coupling part 75 in the gap S1, and the second regulatory member 192 is disposed to overlap the second coupling part 76 in the gap S2. In the wavelength conversion member 50, by the third surface 50c being pressed by the first regulatory member 191 and the second regulatory member 192, the fourth surface 50d comes into contact with the support surface 54s of the groove 154. Thus, the position of the wavelength conversion member 50 with respect to the groove 154 is regulated.

The first regulatory member 191 and the second regulatory member 192 also function as spacer members that keep a gap between the light source unit 70 and the wavelength conversion member 50 at a predetermined distance. The height of the first regulatory member 191 and the second regulatory member 192 is in a range of, for example, about 0.2 mm to 2 mm. The first regulatory member 191 and the second regulatory member 192 are preferably made of a material excellent in light resistance such as metal or glass. The first regulatory member 191 and the second regulatory member 192 may be directly formed at the first surface 71a of the base substrate 71 by a method such as screen printing.

Also in the light source device 300 according to the present modified example, by making the positions at which the first regulatory member 191 and the second regulatory member 192 are disposed coincide with the positions of the gaps S1, S2, the space on the first surface 71a of the base substrate 71 can efficiently be used to reduce the device configuration in size.

Further, by adjusting the number of the light emitting elements constituting the first light emitting element group 72A and the second light emitting element group 72B or the number of the light emitting elements constituting the third light emitting element group 72C and the fourth light emitting element group 72D, the positions of the gaps S1, S2 on the base substrate 71 can easily be changed. Therefore, it is possible to achieve the reduction in size of the device configuration while increasing the degree of freedom of the arrangement place of the first regulatory member 191 and the second regulatory member 192.

Note that the technical scope of the present disclosure is not limited to the embodiments described above, and a variety of changes can be made thereto without departing from the intent of the present disclosure.

For example, there is cited when the convex portion 30 is provided to the support member 54 as an example in the light source device 100 according to the embodiments described above, but it is possible to dispose the convex portion on the first surface 71a of the base substrate 71. Alternatively, it is possible to separate the light emitting element 73 from the support member 54 and the wavelength conversion member 50 by abutting convex portions provided respectively to the support member 54 and the first surface 71a of the base substrate 71 with each other.

There is adopted the configuration in which the convex portion 30 is inserted into the concave portion 60 of the base substrate 71 in the light source device 100 according to the embodiment described above, but it is possible to adopt a configuration in which the convex portion is made to have contact with the first surface 71a of the base substrate 71 not provided with the concave portion. In this case, the pedestal 547a of the support member 54 and the upper surface of the convex portion 30 may be aligned at the same height.

In the light source device 100 according to the embodiment described above, it is possible to adopt a configuration in which the base substrate 71 and the support member 54 can be fixed with a screw in the convex portion 30. According to this configuration, by increasing the number of fixation places between the base substrate 71 and the support member 54, the light source unit 70 and the support member 54 can more firmly be fixed.

There is cited when the wavelength conversion member 50 includes the first protruding portion 151 and the second protruding portion 152 in the X-axis direction as an example in the light source device 100 according to the embodiment described above, but it is possible to dispose the first protruding portion 151 alone. In this case, the holding member 65 is disposed only at the first protruding portion 151 side.

In the embodiment described above, each of the wall surfaces of the groove 154 of the support member 54 has a portion perpendicular to the support surface 54s and a portion inclining with respect to the support surface 54s, but the groove 154 does not necessarily have a specific shape, and all the regions of the wall surfaces of the groove may instead, for example, be perpendicular to the support surface. Further, the wall surfaces of the groove may be curved.

The aforementioned embodiment has been described with reference to the case where the present disclosure is applied to the light source device including the wavelength conversion member. In place of the configuration described above, the present disclosure may be applied to a light source device in which the light having entered the light source device propagates without being involved in wavelength conversion and then exits out of the light source device, for example, with the angular distribution controlled. In this case, the wavelength conversion member in the embodiment described above is replaced with a light guide member, and the light emitted from the light emitting elements exits out of the angle conversion member as light having the same wavelength band.

In addition, the specific descriptions of the shape, the number, the arrangement, the materials, and other factors of the elements of the light source device and the projector are not limited to those in the embodiments described above and can be changed as appropriate. The aforementioned embodiments have been described with reference to the case where the light source device according to the present disclosure is incorporated in a projector using a liquid crystal panel, but not necessarily. The light source device according to the present disclosure may be incorporated in a projector using a digital micromirror device as the light modulation device. The projector may not include a plurality of light modulation devices and may instead include just one light modulation device.

The aforementioned embodiment has been described with reference to the case where the light source device according to the present disclosure is incorporated in a projector, but not necessarily. The light source device according to the present disclosure may be used as a lighting apparatus, a headlight of an automobile, and other components.

The present disclosure will be summarized below as supplementary notes.

Supplementary Note 1

A light source device including:
a light source unit including a base substrate, a first light emitting element group and a second light emitting element group which are arranged on the base substrate with a gap between the first light emitting element group and the second light emitting element group, and a first coupling part which is disposed in the gap and electrically couples the first light emitting element group and the second light emitting element group to each other;
a light guide member configured to guide light emitted from the light source unit;
a support member which is configured to support the light guide member, and to which the base substrate of the light source unit is fixed; and
a first regulatory member which is disposed between the light guide member and the base substrate, and is configured to regulate a position of the light guide member with respect to the support member, wherein
the first light emitting element group has a configuration in which a plurality of first light emitting elements is coupled in series so that a current flows along a first direction,
the second light emitting element group has a configuration in which a plurality of second light emitting elements is coupled in series so that a current flows along a second direction opposite to the first direction, and
the first regulatory member is disposed to overlap the first coupling part in the gap in a plan view of the first regulatory member and the first coupling part.

According to the light source device of this configuration, by making the position at which the first regulatory member is disposed, and the position of the gap coincide with each other, it is possible to realize a reduction in size of the device configuration by efficiently using the space on the base substrate. Further, for example, by adjusting the numbers of the light emitting elements constituting the first light emitting element group and the second light emitting element group without changing the total sum of the light emitting elements constituting the first light emitting element group and the second light emitting element group, it is possible to easily change the position of the gap on the base substrate. Therefore, according to this light source device, it is possible to realize the reduction in size of the device configuration while increasing the degree of freedom of the arrangement place of the regulatory member.

Supplementary Note 2

The light source device described in Supplementary Note 1, wherein
the first coupling part includes a first interconnection which extends along a direction crossing the first direction and includes a first region coupled to the second direction side of the first light emitting element group, and a second interconnection which extends along the first interconnection, includes a second region coupled to the first direction side of the second light emitting element group, and couples the first light emitting element group and the second light emitting element group to each other.

According to this configuration, it is possible to electrically couple the first light emitting element group and the second light emitting element group via the first interconnection and the second interconnection of the first coupling part.

Supplementary Note 3

The light source device described in Supplementary Note 1 or Supplementary Note 2, further including
a second regulatory member that is disposed between the light guide member and the base substrate, and is configured to regulate a position of the light guide member with respect to the support member, wherein
the light source unit further includes
a third light emitting element group and a fourth light emitting element group that are disposed on the base substrate with a gap between the third light emitting element group and the fourth light emitting element group, and are not electrically coupled to the first light emitting element group and the second light emitting element group, and
a second coupling part configured to electrically couple the third light emitting element group and the fourth light emitting element group to each other,
the third light emitting element group has a structure line-symmetrical with a structure of the first light emitting element group,
the fourth light emitting element group has a structure line-symmetrical with a structure of the second light emitting element group,
the second coupling part has a structure line-symmetrical with a structure of the first coupling part, and
the second regulatory member is disposed to overlap the second coupling part in the gap between the third light emitting element group and the fourth light emitting element group in a plan view.

According to this configuration, by further including the third light emitting element group and the fourth light emitting element group, the amount of light incident on the light guide member from the light source unit can be increased. Further, by making the position at which the second regulatory member is disposed, and the position of the gap coincide with each other, it is possible to realize the reduction in size of the device configuration by efficiently using the space on the base substrate. In addition, by further including the second regulatory member, the position of the guide member can be properly regulated with respect to the support member.

Supplementary Note 4

The light source device described in Supplementary Note 2, wherein
the first light emitting element group includes a plurality of first conductive patterns disposed to correspond respectively to the plurality of first light emitting elements, and
each of the plurality of first conductive patterns extends in a direction crossing the first direction.

According to this configuration, since the size of the first conductive pattern becomes larger than that of the first light emitting element, the first conductive pattern can transfer the heat of the first light emitting element toward the base substrate in a state of spreading to the surrounding area. Accordingly, the first conductive pattern is capable of improving the heat dissipation of the first light emitting element.

Supplementary Note 5

The light source device described in Supplementary Note 4, wherein
the plurality of first conductive patterns each extends in both directions crossing the first direction with respect to corresponding one of the first light emitting elements.

According to this configuration, since the area of the first conductive pattern is further increased, the heat dissipation of the first light emitting element can further be enhanced.

Supplementary Note 6

The light source device described in Supplementary Note 4 or Supplementary Note 5, wherein
the first conductive pattern located at a head of the plurality of first conductive patterns arranged in the first direction is electrically coupled to the first region of the first interconnection.

According to this configuration, it is possible to implement the configuration in which the first light emitting element group and the first interconnection are electrically coupled to each other.

Supplementary Note 7

The light source device described in Supplementary Note 2, wherein
the second light emitting element group includes a plurality of second conductive patterns disposed to correspond respectively to the plurality of second light emitting elements, and
each of the plurality of second conductive patterns extends in a direction crossing the second direction.

According to this configuration, since the size of the second conductive pattern becomes larger than that of the second light emitting element, the second conductive pattern can transfer the heat of the second light emitting element toward the base substrate in a state of spreading to the surrounding area. Accordingly, the second conductive pattern is capable of improving the heat dissipation of the second light emitting element.

Supplementary Note 8

The light source device described in Supplementary Note 7, wherein
the plurality of second conductive patterns each extends in both directions crossing the second direction with respect to corresponding one of the second light emitting elements.

According to this configuration, since the area of the second conductive pattern is further increased, the heat dissipation of the second light emitting element can further be enhanced.

Supplementary Note 9

The light source device described in Supplementary Note 7 or Supplementary Note 8, wherein
the second conductive pattern located at a head of the plurality of second conductive patterns arranged in the second direction is electrically coupled to the second region of the second interconnection, and
the second conductive pattern located at a tail of the plurality of second conductive patterns arranged in the second direction is electrically coupled to a ground pattern provided to the base substrate.

According to this configuration, it is possible to realize a configuration in which the plurality of second light emitting elements is coupled in series so that a current flows along the second direction in the second light emitting element group.

Supplementary Note 10

The light source device described in any one of Supplementary Notes 1 to 9, further including
a terminal part which is electrically coupled to the first light emitting element group and the second light emitting element group, and is arranged in a direction crossing the first direction with respect to the first light emitting element group and the second light emitting element group on the base substrate.

According to this configuration, by arranging the terminal part in the direction crossing the first direction in which the first light emitting element group and the second light emitting element group are arranged on the base substrate, it is possible to prevent an increase in size of the base substrate in the first direction.

Supplementary Note 11

The light source device described in Supplementary Note 10, further including
a convex portion that is provided to the base substrate or the support member, and that is configured to bring the base substrate and the support member into contact with each other, wherein
the convex portion and the terminal part are disposed to be opposite to each other across the first light emitting element group and the second light emitting element group.

According to this configuration, since the convex portion can be disposed in an area which is located at an opposite side to the terminal part, and has a roomy area, it is possible to further reduce the size of the light source device by efficiently using the space on the base substrate. Further, by providing the convex portion, the warpage of the base substrate toward the light guide member can be suppressed, and the distance between the light source unit and the guide member can appropriately be maintained.

Supplementary Note 12

The light source device described in Supplementary Note 11, wherein
the base substrate includes a connector unit electrically coupled to the terminal part, and
the support member includes a cutout portion provided at a position corresponding to the connector unit.

According to this configuration, for example, when the base substrate of the light source unit is fixed to the support member, interference with the connector unit provided to the base substrate can be prevented by the cutout portion.

Supplementary Note 13

The light source device described in any one of Supplementary Notes 1 to 12, wherein
the first light emitting elements and the second light emitting elements are configured to emit first light having a first wavelength band, and
the light guide member is a wavelength conversion member that includes a phosphor, and is configured to convert the first light emitted from the first light emitting elements and the second light emitting elements into second light having a second wavelength band different from the first wavelength band to emit the second light.

According to this configuration, it is possible to realize the light source device which is high in use efficiency of the first light, and obtains the second light having a desired intensity.

Supplementary Note 14

A projector including:
the light source device described in any one of Supplementary Notes 1 to 13;
a light modulation device configured to modulate light emitted from the light source device in accordance with image information; and
a projection optical device configured to project the light modulated by the light modulation device.

According to the projector having this configuration, since the light source device described above is provided, it is possible to provide a projector excellent in light use efficiency.

What is claimed is:

1. A light source device comprising:
a light source unit including a base substrate, a first light emitting element group and a second light emitting element group which are arranged on the base substrate with a gap between the first light emitting element group and the second light emitting element group, and a first coupling part which is disposed in the gap and electrically couples the first light emitting element group and the second light emitting element group to each other;
a light guide member configured to guide light emitted from the light source unit;
a support member which is configured to support the light guide member, and to which the base substrate of the light source unit is fixed; and
a first regulatory member which is disposed between the light guide member and the base substrate, and is configured to regulate a position of the light guide member with respect to the support member, wherein
the first light emitting element group has a configuration in which a plurality of first light emitting elements is coupled in series so that a current flows along a first direction,
the second light emitting element group has a configuration in which a plurality of second light emitting elements is coupled in series so that a current flows along a second direction opposite to the first direction, and
the first regulatory member is disposed to overlap the first coupling part in the gap in a plan view of the first regulatory member and the first coupling part.

2. The light source device according to claim 1, wherein
the first coupling part includes a first interconnection which extends along a direction crossing the first direction and includes a first region coupled to the second direction side of the first light emitting element group, and a second interconnection which extends along the first interconnection, includes a second region coupled to the first direction side of the second light emitting element group, and couples the first light emitting element group and the second light emitting element group to each other.

3. The light source device according to claim 1, further comprising:
a second regulatory member that is disposed between the light guide member and the base substrate, and is configured to regulate a position of the light guide member with respect to the support member, wherein
the light source unit further includes
a third light emitting element group and a fourth light emitting element group that are disposed on the base substrate with a gap between the third light emitting element group and the fourth light emitting element group, and are not electrically coupled to the first light emitting element group and the second light emitting element group, and
a second coupling part configured to electrically couple the third light emitting element group and the fourth light emitting element group to each other,
the third light emitting element group has a structure line-symmetrical with a structure of the first light emitting element group,
the fourth light emitting element group has a structure line-symmetrical with a structure of the second light emitting element group,
the second coupling part has a structure line-symmetrical with a structure of the first coupling part, and
the second regulatory member is disposed to overlap the second coupling part in the gap between the third light emitting element group and the fourth light emitting element group in a plan view.

4. The light source device according to claim 2, wherein
the first light emitting element group includes a plurality of first conductive patterns disposed to correspond respectively to the plurality of first light emitting elements, and
each of the plurality of first conductive patterns extends in a direction crossing the first direction.

5. The light source device according to claim 4, wherein the plurality of first conductive patterns each extends in both directions crossing the first direction with respect to corresponding one of the first light emitting elements.

6. The light source device according to claim 4, wherein the first conductive pattern located at a head of the plurality of first conductive patterns arranged in the first direction is electrically coupled to the first region of the first interconnection.

7. The light source device according to claim 2, wherein the second light emitting element group includes a plurality of second conductive patterns disposed to correspond respectively to the plurality of second light emitting elements, and each of the plurality of second conductive patterns extends in a direction crossing the second direction.

8. The light source device according to claim 7, wherein the plurality of second conductive patterns each extends in both directions crossing the second direction with respect to corresponding one of the second light emitting elements.

9. The light source device according to claim 7, wherein the second conductive pattern located at a head of the plurality of second conductive patterns arranged in the second direction is electrically coupled to the second region of the second interconnection, and the second conductive pattern located at a tail of the plurality of second conductive patterns arranged in the second direction is electrically coupled to a ground pattern provided to the base substrate.

10. The light source device according to claim 1, further comprising:

a terminal part which is electrically coupled to the first light emitting element group and the second light emitting element group, and is arranged in a direction crossing the first direction with respect to the first light emitting element group and the second light emitting element group on the base substrate.

11. The light source device according to claim 10, further comprising:

a convex portion that is provided to the base substrate or the support member, and that is configured to bring the base substrate and the support member into contact with each other, wherein the convex portion and the terminal part are disposed to be opposite to each other across the first light emitting element group and the second light emitting element group.

12. The light source device according to claim 11, wherein the base substrate includes a connector unit electrically coupled to the terminal part, and the support member includes a cutout portion provided at a position corresponding to the connector unit.

13. The light source device according to claim 1, wherein the first light emitting elements and the second light emitting elements are configured to emit first light having a first wavelength band, and the light guide member is a wavelength conversion member that includes a phosphor, and is configured to convert the first light emitted from the first light emitting elements and the second light emitting elements into second light having a second wavelength band different from the first wavelength band to emit the second light.

14. A projector comprising:

the light source device according to claim 1;

a light modulation device configured to modulate light emitted from the light source device in accordance with image information; and a projection optical device configured to project the light modulated by the light modulation device.

\* \* \* \* \*